United States Patent [19]

Kim

[11] Patent Number: 5,764,775

[45] Date of Patent: Jun. 9, 1998

[54] AUDIO PROCESSING UNIT FOR MIXING L CHANNEL AND R CHANNEL OF CD/CD-1 AUDIO SIGNAL

[75] Inventor: Jong-Dae Kim, Seoul, Rep. of Korea

[73] Assignee: Samsung Electronics Co., Ltd., Suwon, Rep. of Korea

[21] Appl. No.: 550,874

[22] Filed: Oct. 31, 1995

[30] Foreign Application Priority Data

May 17, 1995 [KR] Rep. of Korea ............... 1995/12242

[51] Int. Cl.$^6$ ................................................. H04R 5/00
[52] U.S. Cl. ................................................. 381/1
[58] Field of Search ............................. 381/1, 17, 18, 381/2, 19, 22, 119

[56] References Cited

U.S. PATENT DOCUMENTS 5,099,739  3/1992  Adachi ........................... 381/17
5,420,939  5/1995  Geddes et al. ................... 381/1

Primary Examiner—Curtis Kuntz
Assistant Examiner—Vivian Chang
Attorney, Agent, or Firm—Cushman Darby & Cushman, IP Group of Pillsbury Madison & Sutro LLP

[57] ABSTRACT

Audio process units for controllably mixing L-channel and R-channel portions of a CD/CD-I audio signal each use a single attenuator (or digital multiplier) for developing L*G (LL), L*G(LR), R*G(RR) and R*G(RL) responses to L-channel and R-channel input signals through time sharing processing. This reduces the amount of digital hardware required for developing these responses. The L*G(LL) and R*G(RL) responses are additively combined to generate an L-channel output signal; and the R*G(RL) and R*G(RR) responses are additively combined to generate an R-channel output signal. L*G(LL), L*G(LR), R*G(RL) and R*G(RR) responses are successively generated on a cyclic basis in one type of such audio process unit, using a successive-shift-and-selective-accumulation digital multiplication procedure to generate each response. L*G(LR), L*G(LL), R*G(RL) and R*G(RR) responses are successively generated on a cyclic basis in an altenative type of such audio process unit, using a successive-shift-and-selective-accumulation digital multiplication procedure to generate each response.

20 Claims, 14 Drawing Sheets

FIG.3A

| Required attenuation | Standardized value | Attenuation (binary code) | Attenuation (DB) |
|---|---|---|---|
| 0 DB | 1.000000 → | 11111111 → | −0.0340 DB |
| −1 DB | 0.891251 → | 11100100 → | −1.0061 DB |
| −2 DB | 0.794328 → | 11001011 → | −2.0149 DB |
| −3 DB | 0.707946 → | 10110101 → | −3.0112 DB |
| −4 DB | 0.630957 → | 10100001 → | −4.0283 DB |
| −5 DB | 0.562341 → | 10001111 → | −5.0581 DB |
| −6 DB | 0.501187 → | 10000000 → | −6.0206 DB |
| −7 DB | 0.446684 → | 01110010 → | −7.0267 DB |
| −8 DB | 0.398107 → | 01100101 → | −8.0784 DB |
| −9 DB | 0.354813 → | 01011010 → | −9.0799 DB |
| −10 DB | 0.316228 → | 01010000 → | −10.1030 DB |
| −11 DB | 0.281838 → | 01001000 → | −11.0181 DB |
| −12 DB | 0.251189 → | 01000000 → | −12.0412 DB |
| −13 DB | 0.223872 → | 00111001 → | −13.0473 DB |
| −14 DB | 0.199526 → | 00110011 → | −14.0134 DB |
| −15 DB | 0.177828 → | 00101101 → | −15.1005 DB |
| −16 DB | 0.158489 → | 00101000 → | −16.1236 DB |
| −17 DB | 0.141254 → | 00100100 → | −17.0387 DB |
| −18 DB | 0.125893 → | 00100000 → | −18.0618 DB |
| −19 DB | 0.112202 → | 00011100 → | −19.2216 DB |
| −20 DB | 0.100000 → | 00011001 → | −20.2060 DB |
| −21 DB | 0.089125 → | 00010110 → | −21.3163 DB |
| −22 DB | 0.079433 → | 00010100 → | −22.1442 DB |
| −23 DB | 0.070795 → | 00010010 → | −23.0593 DB |
| −24 DB | 0.063096 → | 00010000 → | −24.0824 DB |
| −25 DB | 0.056234 → | 00001110 → | −25.2422 DB |
| −26 DB | 0.050119 → | 00001100 → | −26.5812 DB |
| −27 DB | 0.044668 → | 00001011 → | −27.3369 DB |
| −28 DB | 0.039811 → | 00001010 → | −28.1648 DB |
| −29 DB | 0.035481 → | 00001001 → | −29.0799 DB |
| −30 DB | 0.031623 → | 00001000 → | −30.1030 DB |
| −31 DB | 0.028184 → | 00000111 → | −31.2628 DB |
| −32 DB | 0.025119 → | 00000110 → | −32.6018 DB |
| −33 DB | 0.022387 → | 00000101 → | −34.1854 DB |
| −34 DB | 0.019953 → | 00000101 → | −34.1854 DB |
| −35 DB | 0.017783 → | 00000100 → | −36.1236 DB |

FIG.3B

| Required attenuation | Standardized value | Attenuation (binary code) | Attenuation (DB) | |
|---|---|---|---|---|
| −36 DB | 0.015849 → | 00000100 → | −36.1236 DB | |
| −37 DB | 0.014125 → | 00000011 → | −38.6224 DB | |
| −38 DB | 0.012589 → | 00000011 → | −38.6224 DB | |
| −39 DB | 0.011220 → | 00000010 → | −42.1442 DB | |
| −40 DB | 0.010000 → | 00000010 → | −42.1442 DB | |
| −41 DB | 0.008913 → | 00000010 → | −42.1442 DB | |
| −42 DB | 0.007943 → | 00000010 → | −42.1442 DB | |
| −43 DB | 0.007079 → | 00000001 → | −48.1648 DB | |
| −44 DB | 0.006310 → | 00000001 → | −48.1648 DB | |
| −45 DB | 0.005623 → | 00000001 → | −48.1648 DB | |
| −46 DB | 0.005012 → | 00000001 → | −48.1648 DB | |
| −47 DB | 0.004467 → | 00000001 → | −48.1648 DB | |
| −48 DB | 0.003981 → | 00000001 → | −48.1648 DB | |
| −49 DB | 0.003548 → | 00000000 → | −Inf DB | ⎫ |
| −50 DB | 0.003162 → | 00000000 → | −Inf DB | |
| −51 DB | 0.002818 → | 00000000 → | −Inf DB | |
| −52 DB | 0.002512 → | 00000000 → | −Inf DB | |
| −53 DB | 0.002239 → | 00000000 → | −Inf DB | |
| −54 DB | 0.001995 → | 00000000 → | −Inf DB | |
| −55 DB | 0.001778 → | 00000000 → | −Inf DB | |
| −56 DB | 0.001585 → | 00000000 → | −Inf DB | |
| −57 DB | 0.001413 → | 00000000 → | −Inf DB | |
| −58 DB | 0.001259 → | 00000000 → | −Inf DB | ⎬ infinite attenuation |
| −59 DB | 0.001122 → | 00000000 → | −Inf DB | |
| −60 DB | 0.001000 → | 00000000 → | −Inf DB | |
| −61 DB | 0.000891 → | 00000000 → | −Inf DB | |
| −62 DB | 0.000794 → | 00000000 → | −Inf DB | |
| −63 DB | 0.000708 → | 00000000 → | −Inf DB | |
| −64 DB | 0.000631 → | 00000000 → | −Inf DB | |
| −65 DB | 0.000562 → | 00000000 → | −Inf DB | |
| ⟨ | ⟨ | ⟨ | ⟨ | |
| −127 DB | 0.000000 → | 00000000 → | −Inf DB | ⎭ |

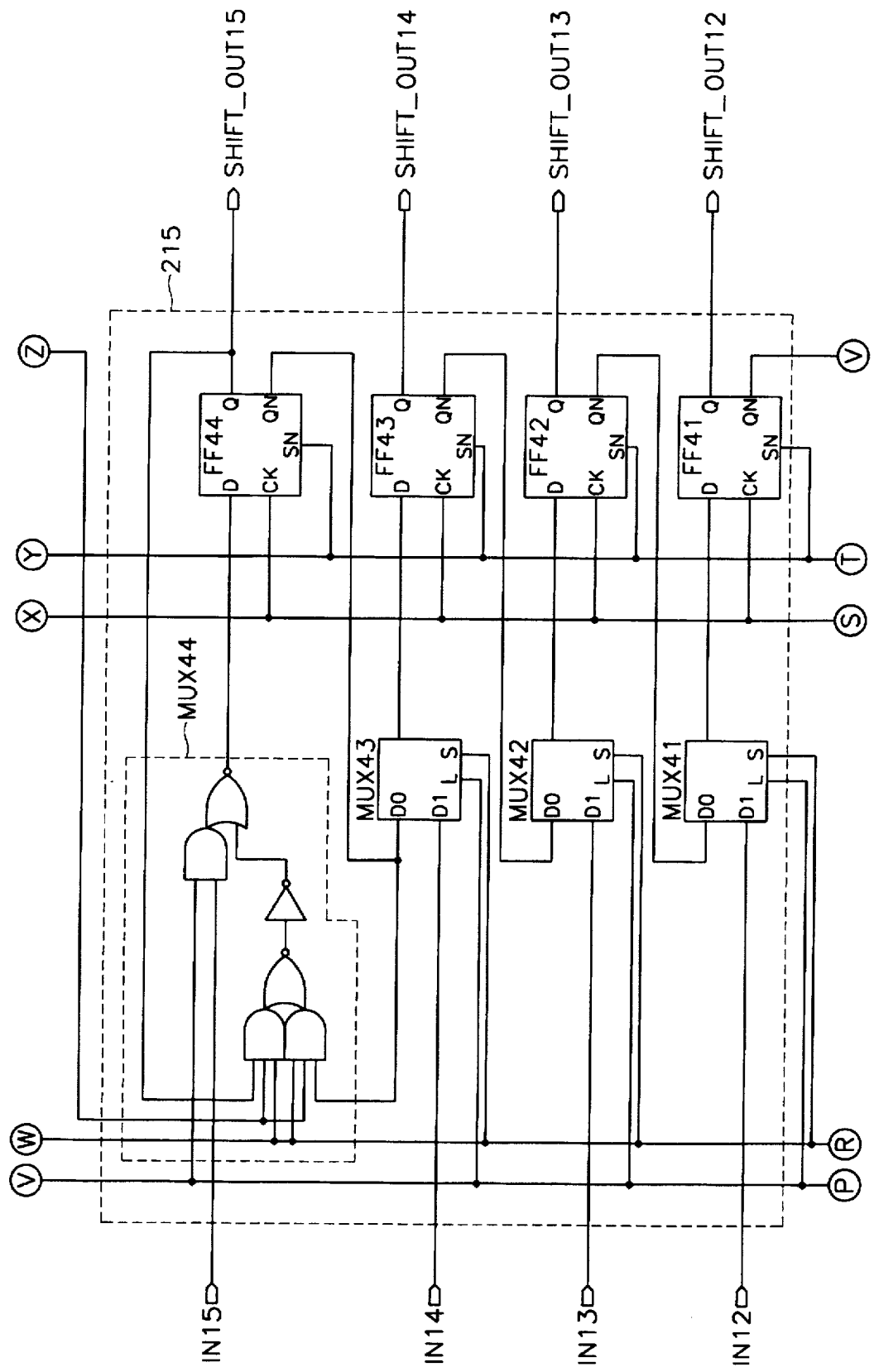

AUDIO PROCESSING UNIT FOR MIXING L CHANNEL AND R CHANNEL OF CD/CD-1 AUDIO SIGNAL

The present invention relates to an audio processing unit for controllably mixing left-channel and right-channel responses to a digital audio signal supplied in accordance with compact-disk audio signal standard, the controllable mixing being done in response to eight-bit indications of left-input-to-left-output gain G(LL), left-input-to-right-output gain G(LR), right-input-to-right-output gain G(RR) and right-input-to-left-output gain G(RL) also supplied in accordance with compact-disk audio signal standard, the audio processing unit functioning as a given stereophonic audio mixer.

BACKGROUND OF THE INVENTION

In this specification the acronym "CD" is used instead of the phrase "compact disc"; the acronym "APU" is used instead of the phrase "audio processing unit; the acronym "ROM" is used instead of the phrase "read-only memory" the acronym "DAC" is used instead of the phrase "digital-to-analog converter" and the acronym "ADPCM" is refers to "adaptive differential pulse code modulation". The terms "L-channel" and "R-channel" refer to the left-channel and the right-channel ones respectively of a pair of stereophonic signals. CD-I (CD-Interactive) is a household electric appliance which is manufactured to manage various information that can be stored on a compact disc which includes audio, image, computer data, etc.

To reduce the amount of data to be recorded on a disk, a CD-I system compresses a digital stereophonic audio signal up to a maximum of sixteen times using an ADPCM encoder. This digital stereophonic audio signal is composed of alternate L- channel and R- channel digital audio samples which interleave in time. When playing back from the disk, an ADPCM decoder de-compresses the compressed digital stereophonic audio signal, which is supplied to an APU that functions as an audio mixer to mix the L-channel and R-channel audio signals. Such mixing permits implementing certain sound effects (e. g., an echo or a surround sound) in addition to conventional stereophonic effects.

FIG. 1 of the drawing depicts audio signal mixing procedures between the L-channel and R-channel in a conventional APU; and FIG. 2 shows a conventional APU for mixing between the L channel and R channel of CD/CD-I audio signal, and peripherals. A conventional APU attenuates the L-channel audio signal to generate LL and RL responses using respective attenuators, attenuates the R-channel audio signal to generate RR and LR responses using respective attenuators, additively combines or mixes the LL and RL responses to generate a modified L-channel response L', and additively combines or mixes the RR and LR responses to generate a modified R-channel response R'. The respective designations (LL,LR,RR,RL) for audio signals indicate the signal routing between input and output connections, respectively, of the APU. For example, the audio signal LR (Left-to-Right) refers to the response to signal applied to a left channel input terminal of the APU that is supplied from a right channel output terminal of the APU.

Referring to FIG. 1, L signal applied to L-channel input terminal 2 is supplied to L-channel output terminal 3 through an attenuator 4, which has a transfer gain G(LL). At the same time, R signal applied to R-channel input terminal 7 is supplied to the L-channel output terminal 3 through another attenuator 5, which has a transfer gain G(RL). The responses of the attenuators 4 and 5 are additively mixed by an adder 6 for application to the L-channel output terminal 3. Ultimately, the adder 6 supplies a modified L-channel audio signal L' which is indicated to equal {L*G(LL)+R*G (RL)} in FIG. 1, the asterisk indicating multiplication. That is, the signal L' supplied from the L-channel output terminal 3 includes not only the attenuator 4 response to L-channel input signal L, but also includes the attenuator 5 response to R-channel input signal R mixed therewith.

Similarly, R signal applied to R-channel input terminal 7 is supplied to R-channel output terminal 8 through an attenuator 9, which has a transfer gain G(RR). At the same time, L signal applied to L-channel input terminal 2 is supplied to the R-channel output terminal 8 through another attenuator 10, which has a transfer gain G(LR). The responses of the attenuators 9 and 10 are additively mixed by an adder 11 for application to the R-channel output terminal 8. Ultimately, the adder 11 supplies a modified R- channel audio signal R' which is indicated to equal {R*G(RR)+L*G (LR)} in FIG. 1. That is, the signal R' supplied from the output terminal 8 of the R channel includes not only the attenuator 9 response to R-channel input signal R, but also includes the attenuator 10 response to L-channel input signal L mixed therewith.

FIG. 2 shows a conventional APU 700 and its peripheral equipment. An ADPCM decoder 600 receives CD-I audio data descriptive of time-interleaved, alternate L-channel and R-channel digital audio samples as compressed by an ADPCM encoder (not shown). The ADPCM decoder 600 de-compresses the compressed audio data to recover the time-interleaved, alternate L-channel and R-channel samples. The conventional APU 700 receives the alternate L-channel and R-channel digital audio samples supplied from the ADPCM decoder 600, or other alternate L-channel and R-channel digital audio samples (CD-DA) supplied from a CD player, and de-interleaves the alternate L-channel and R-channel digital audio samples to provide parallel sample streams. The conventional APU 700 attenuates the stream of L-channel samples using a respective pair of attenuators for supplying respective L*G(LL) and L*G(LR) responses with desired degrees of attenuation, and attenuates the stream of R-channel samples using a respective pair of attenuators for supplying respective R*G(RL) and R*G(RR) responses with desired degrees of attenuation. The conventional APU 700 additively combines the L*G(LL) and R*G(RL) samples to generate a stream of modified L-channel (or L') samples and additively combines the R*G(RR) and L*G(LR) samples to generate a stream of modified R-channel (or R') samples. The L' samples are supplied to a digital-to-analog converter (DAC) 800 for conversion to an analog L' signal, and the R' samples are supplied to a digital-to-analog converter (DAC) 900 for conversion to an analog R' signal. A microcontroller 500 provides overall control for the above described system and governs the timing of the de-interleaving of time-interleaved samples.

The conventional APU 700 uses a separate respective attenuator (or two-quadrant digital multiplier) to perform the desired attenuation of each of the audio signals (LL, LR, RR, RL), so that it requires four attenuators. Consequently, the area taken up on an integrated circuit die by the attenuators is quite extensive.

SUMMARY OF THE INVENTION

An audio processing unit (APU) controllably mixes left-channel and right-channel responses to a digital audio signal supplied in accordance with a given compact-disk audio signal standard, the controllable mixing being done in response to eight-bit indications of left-input-to-left-output gain G(LL), left-input-to-right-output gain G(LR), right-input-to-right-output gain G(RR) and right-input-to-left-output gain G(RL) also supplied in accordance with compact-disk audio signal standard. There is an audio-processing-unit input connection for receiving time-interleaved alternate samples of the left-channel and right-channel portions of the digital audio signal. An attenuation coefficient signal generator responds to the eight-bit indications of left-input-to-left-output gain G(LL), left-input-to-right-output gain G(LR), right-input-to-right-output gain G(RR) and right-input-to-left-output gain G(RL) for generating actual attenuation coefficients supplied in serial-bit form. A first successive-shift-and-selective-accumulation procedure and a second successive-shift-and-selective-accumulation procedure are sequentially performed on each of the samples of the digital audio signal, the first successive-shift-and-selective-accumulation procedure generating a first accumulation result, and the second successive-shift-and-selective-accumulation procedure generating a second accumulation result. One of the first and second accumulation results for each sample of the left-channel portion of the digital audio signal is additively combined with the first accumulation result for the succeeding sample of the right-channel portion of the digital audio signal to generate a successive sample of controllably mixed L-channel response; and the other of the first and second accumulation results for each sample of the left-channel portion of the digital audio signal is additively combined with the second accumulation result for the succeeding sample of the right-channel portion of the digital audio signal to generate a successive sample of controllably mixed R-channel response.

An APU that is a first embodiment of the invention uses a single attenuator (or digital multiplier) for developing L*G(LL), L*G(LR), R*G(RR) and R*G(RL) responses to L channel and R channel input signals through time sharing processing, to reduce the amount of digital hardware required for developing these responses. The L*G(LL), L*G(LR), R*G(RL) and R*G(RR) responses are successively generated on a cyclic basis, using a successive-shift-and-selective-accumulation digital multiplication procedure to generate each response. The L*G(LL) and R*G(RL) responses are additively combined to generate an L-channel output signal; and the R*G(RL) and R*G(RR) responses are additively combined to generate an R-channel output signal.

Another APU that is a second embodiment of the invention uses a single attenuator (or digital multiplier) for developing R*G(LR)+L*G(LL) response and L*G(LR)+R*G(RR) response to L channel and R channel input signals through time sharing processing, to reduce the amount of digital hardware required for developing these responses. The L*G(LR), L*G(LL), R*G(RL) and R*G(RR) are successively generated on a cyclic basis, using a successive-shift-and-selective-accumulation digital multiplication procedure to generate each response. The L*G(LL) and R*G(RL) responses are additively combined to generate an L-channel output signal; and the R*G(RL) and R*G(RR) responses are additively combined to generate an R-channel output signal.

Another APU that embodies the invention comprises an input connection for receiving time-interleaved alternate samples of the left-channel and right-channel portions of the digital audio signal supplied in accordance with a given compact-disk audio signal standard; an attenuation coefficient signal generator for receiving eight-bit indications of left-input-to-left-output gain G(LL), left-input-to-right-output gain G(LR), right-input-to-right-output gain G(RR) and right-input-to-left-output gain G(RL) supplied in accordance with compact-disk audio signal standard and converting them to actual attenuation coefficients in at least substantial accordance with the table of FIG. 3 of the drawing; and a digital multiplier providing time sharing processing. In this time sharing processing each sample L of the left-channel portion of the audio signal is multiplied by the actual left-input-to-left-output gain G(LL) supplied from the attenuation coefficient signal generator to generate a product L*G(LL); each sample L of the left-channel portion of the audio signal is multiplied by the actual left-input-to-right-output gain G(LR) supplied from the attenuation coefficient signal generator to generate a product L*G(LR) each corresponding sample R of the right-channel portion of the audio signal is multiplied by the actual right-input-to-left-output gain G(RL) supplied in from the attenuation coefficient signal generator to generate a product R*G(RL); and each corresponding sample R of the right-channel portion of the audio signal is multiplied by the actual right-input-to-right-output gain G(RR) supplied from the attenuation coefficient signal generator to generate a product R*G(RR). The products L*G(LL) and R*G(RL) are additively combined to generate a successive sample of controllably mixed L-channel response; and the products L*G(LR) and R*G(RR) are additively combined to generate a successive sample of controllably mixed R-channel response.

BRIEF DESCRIPTION OF THE DRAWING

FIG. 3 is an attenuation coefficient table showing a real attenuation (standardized value) in response to the attenuation required during performing a signal attenuation in APU using a mixing between L channel and R channel of CD/CD-I audio signal in accordance with a preferred embodiment of the present invention.

FIGS. 10A, 10B, 10C, 10D and 10E together form a detailed circuit diagram of a shift register used in the FIG. 4 or FIG. 8 APU.

DETAILED DESCRIPTION OF THE PREFERRED EMBODIMENTS

Figure 1:
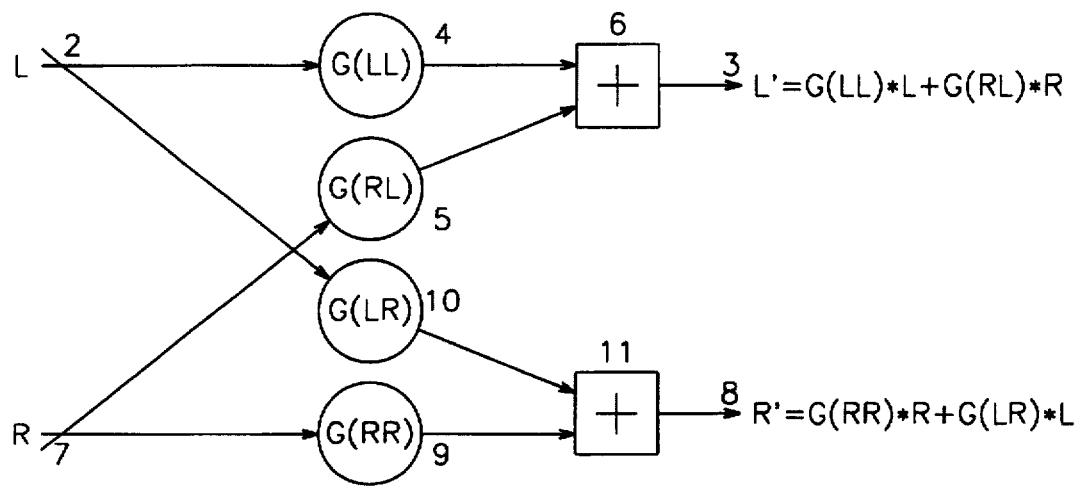
FIG. 1 is a block diagram of audio signal mixing procedures between L channel and R channel in a conventional APU.

Standards regarding audio processing are set out in the "green book" by Sony/Phillips Corporations determining the format of an initial CD-I system. As a basic option, the green book defines an attenuation coefficient with four directions (left-to-right, left-to-left, right-to-right, right-to-left). The attenuation coefficient has 8 bits associated with each direction, respectively. The most significant bit 7 is a control bit for muting the audio signal output, and bits 0 to 6 provide a binary coded description of ranges from 0 to 127, and should be controlled as 1 dB per one range. However, since the audio signal is ultimately sensed by the human hearing system, error is permissible as long it does not seriously affect the ability of a human with good hearing to determine the directionality of stereophonic sound or to guage the loudness of sound. Accordingly, the standards allow a ±1 dB amplitude error up to 20 dB, and for attenuation of more than 20 dB allow a ±1 dB amplitude error inasfar as being too large in amplitude and an optional value of error inasfar as being too small in amplitude. The above description can be simply explained by the following expression.

$$0 \text{ dB to } -20 \text{ dB range} \ldots <+/-1 \text{ dB amplitude error} \quad (1)$$

$$-20 \text{ dB to } -127 \text{ dB range} \ldots <+1 \text{ dB or } -x \text{ dB } (x>0) \text{ amplitude error} \quad (2)$$

When the audio mixer attenuates the audio signal, a required attenuation and a decimal value which are based on the basic option defined in the green book are shown in the leftmost and second leftmost columns of the attenuation coefficient table of FIG. 3.

The bits 0 to 6 of the G(LL), G(LR), G(RR) or G(LR) coefficients in the standard are logarithmic descriptions of the actual attenuation coefficients, and the actual (or "real") attenuation coefficients can be determined by using these logarithmic descriptions as input addressing for read-only memory storing these real attenuation coefficients in binary coded form. These real attenuation coefficient values are not part of the standard specified by the green book, so individual manufacturers can define these real attenuation coefficient values differently with various degrees of error. The second rightmost column of the attenuation coefficient table of FIG. 3 shows the real attenuation coefficients currently favored by the inventor for use in the APUs embodying his invention; and the rightmost column shows the corresponding decibel gain for each of these real attenuation coefficients. The real attenuation coefficients favored by the inventor include only eight bits, but have acceptably low error to meet the green book standards.

Figure 4:
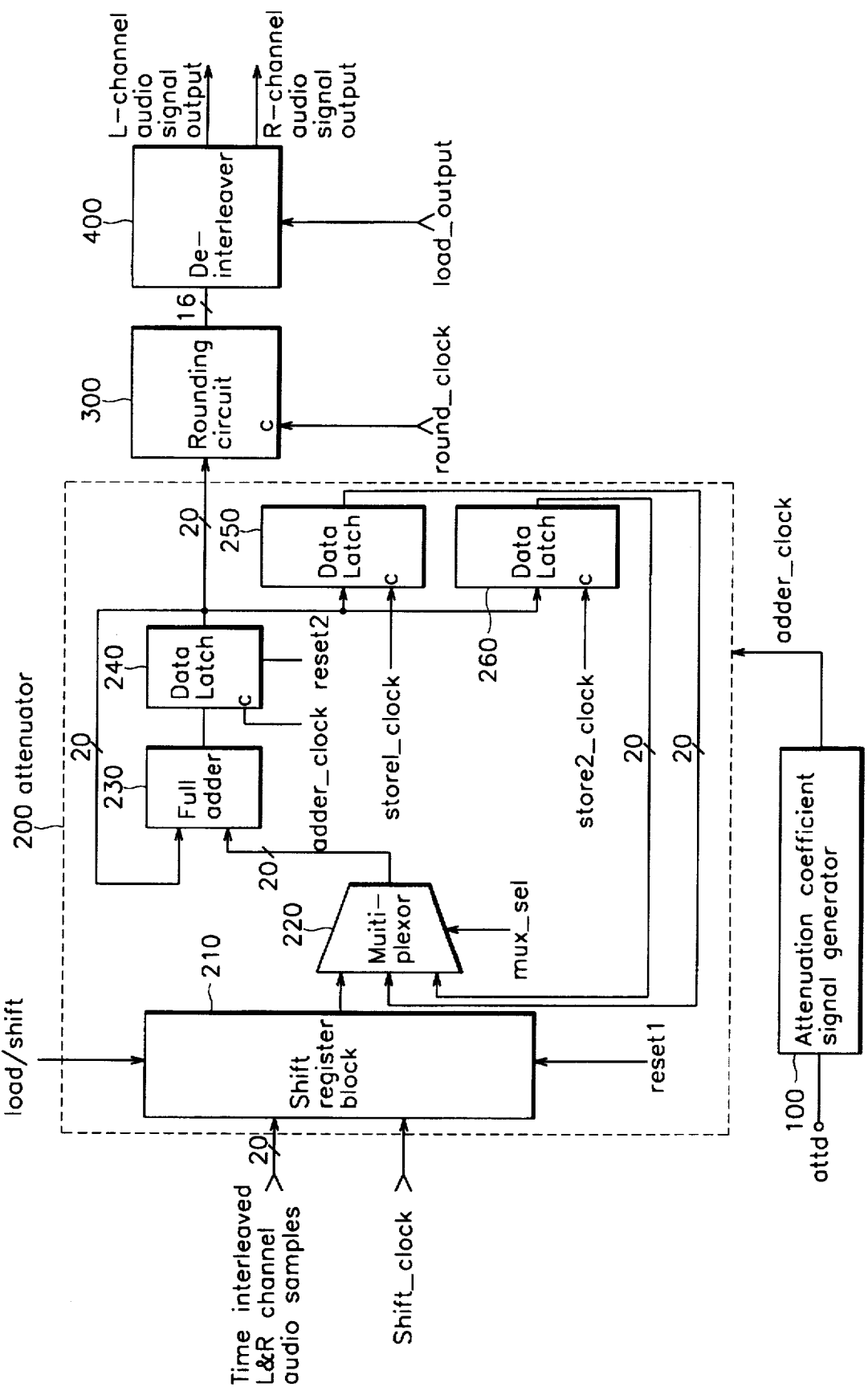
FIG. 4 is a block diagram of an APU for mixing L-channel and R-channel CD/CD-I audio signals in accordance with one preferred embodiment of the present invention.

The FIG. 4 APU is constructed in accordance with the invention to use a single attenuator 200 on a time-share basis to develop L*G(LL), L*G(LR), R*G(RR) and L*G(LR) responses to L channel and R channel input signals. The FIG. 4 APU includes an attenuation coefficient signal generator 100, an attenuator 200, a rounding circuit 300, and a de-interleaver 400.

Figure 2:
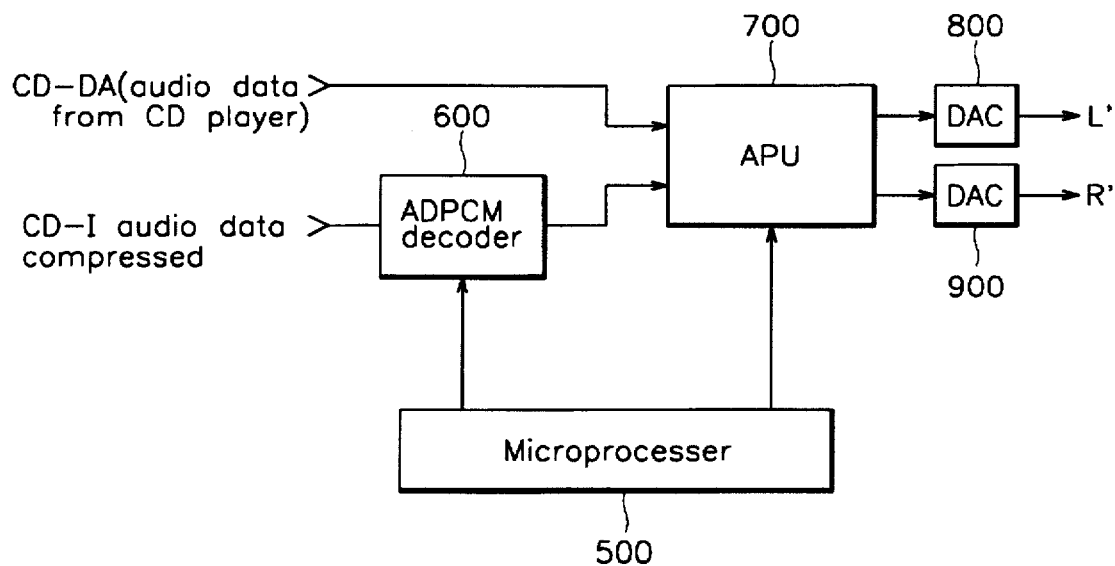
FIG. 2 shows a conventional arrangement of APU and peripheral equipment, used in the prior art and followed in the present invention.

The attenuation coefficient signal generator 100 receives from the FIG. 2 microprocessor 500 the standard 7-bit logarithmic description of a desired value of attenuation G(LL), G(R), G(RR) or G(LR) for the particular attenuation procedure that is to be carried out on a time-shared basis. Responsive to this desired value of attenuation, the attenuation coefficient signal generator 100 generates an 8-bit real attenuation coefficient, and supplies the 8 bits serially, most significant bit first, as a clock signal (adder_clock) for clocking accumulation in the successive shift and selective accumulation procedures carried out in the attenuator 200. The attenuation coefficient signal generator 100 can include a ROM and a parallel-in/serial-out register, or "side-loaded" shift register, for example, with the standard 7-bit logarithmic description of a desired value of attenuation being used to address the ROM, with the 8-bit real attenuation coefficient supplied in parallel-bit form from the ROM being loaded into the shift register, and with the shift register contents being clocked out serially for generating the clock signal adder_clock.

The attenuator 200 includes a shift register block 210, a three-input multiplexer 220 responsive to a multiplexer control signal selecting, a full adder 230, a first twenty-bit-wide data latch 240 clocked by the clock signal adder_clock for latching sum output signal from the adder 230, a second twenty-bit-wide data latch 250 clocked by a first storing control-signal (store1_clock) for storing the data latch 240 output signal temporarily, and a third twenty-bit-wide data latch 260 clocked by a second storing control-signal (store2_clock) for storing the data latch 240 output signal temporarily. Each of the twenty-bit-wide data latches 240, 250 and 260 is composed of a respective battery of twenty data (D) flip-flops.

The shift register block 210 receives the successive L-channel and R-channel input samples, a shift clock signal (shift_clock), a first selection signal (load/shift), and a first reset signal (reset). Each successive sample of the digital audio signal supplied to the shift register block 210 consists of 20 bits, is loaded with the least significant bit (LSB) in the last stage of the register for carrying out one attenuation procedure, and is subsequently re-loaded with the least significant bit (LSB) in the last stage of the register for carrying out another attenuation procedure. Accordingly, the shift register block 210 is preferably a parallel-in/serial-out register, or "side-loaded" shift register, into which a parallel-bit signal is loaded or re-loaded in response to the first selection signal being in its load condition. Alternative arrangements using a shift register serially loaded with serial-bit signal are possible, but require additional temporary storage to implement input samples being reloaded into the shift register a second time to carry out time-shared attenuation procedures in accordance with the invention. Each input data sample to the shift register block 210 corresponds to an output data sample of the ADPCM decoder 600 which in actuality is a two's complement number 16 bits in length, but shift register block 210 receives 20 bits including four ZERO fractional bit places beyond the binary point, which permits rounding error to be reduced in the rounding circuit 300.

When the first selection signal is in its shift condition, the shift register block 210 generates successive binary fractions ½, ¼, ⅛, 1/16, 1/32, 1/64, 1/128, 1/256 of the input sample sequentially by shifting the supplied audio signal responsive to shift_clock, which successive binary fractions are supplied as a first input signal to the three-input multiplexer 220. The multiplexer 220 responds to a second selection signal (mux_sel) from the FIG. 2 microprocessor 500, for selecting which one of its three input signals is to be reproduced as its output signal. During the controlled attenuation procedure, the multiplexer 220 selects the shifted contents of the shift register block 210 to the adder 230 as its first summand input signal. Any fraction n/256 of the input sample, where n is an integer between 0 and 255 inclusive, can be generated by selective accumulation of the successive binary fractions ½, ¼, ⅛, 1/16, 1/32, 1/64, 1/128, 1/256 of the input sample sequentially supplied from the shift register block 210 to the multiplexer 220. The second summand input signal to the adder 230 is the output signal from the data latch 240, which provides the output signal from the attenuator 200. Whenever one of the successive binary fractions ½, ½, ¼, ⅛, 1/16, 1/32, 1/64, 1/128, 1/256 of the input sample is a component of the attenuator response, as indicated by a ONE in the adder_clock signal generated by the attenuation coefficient signal generator 100, the temporarily stored contents of the data latch 240 are updated by latching the then-current sum output signal from the adder 230. This sum output signal from the adder 230 augments the previous temporarily stored contents of the data latch 240 received by the adder 230 as its second summand input signal by the one of the successive binary fractions ½, ¼, ⅛, 1/16, 1/32, 1/64, 1/128, 1/256 of the input sample currently applied to the adder 230 as its first summand input signal. When a successive shift and selective accumulation procedure is completed, the temporarily stored contents of the data latch 240 can be temporarily stored in the data latch 250 responsive to a store1_clock, can be temporarily stored in the data latch 260 responsive to a store2_clock, or can be clocked into the rounding circuit 300 responsive to a round_clock.

The temporarily stored contents of the data latch 240 can then be reset to arithmetic zero by a second reset signal (reset2) furnished from the FIG. 2 microprocessor 500, so that a new successive shift and selective accumulation procedure can be begun. The second selection signal mux_sel supplied from the FIG. 2 microprocessor 500 to the multiplexer 220 can thereafter be used to select the temporarily stored contents of either of the data latches 250 and 260 as a basis for further accumulation in order to additively mix signals.

The 20-bit sample clocked into the rounding circuit 300 responsive to a round_clock is reduced to a 16-bit sample to fit within the dynamic range of the DAC 800 or 900. This can be done simply by discarding the four least significant bits of each 20-bit sample clocked into the rounding circuit 300, in which case the rounding circuit 300 can simply consist of a 16-bit-wide clocked data latch. However, supposing the L-channel and R-channel signals are sampled at a multiple of Nyquist rate, more sophisticated rounding schemes are possible. For example, the less significant bits of groups of successive L-channel samples can be averaged over the Nyquist rate period to determine whether a rounding up of selected L-channel samples should occur at Nyquist rate; and the less significant bits of groups of successive R-channel samples can be averaged over the Nyquist rate period to determine whether a rounding up of selected R-channel samples should occur at Nyquist rate. The rounding circuit 300 supplies the 16-bit-wide rounded signal to the de-interleaver 400, which separates the time-interleaved L' and R' samples supplied from the rounding circuit 300 to supply a stream of L' samples to the DAC 800 and to supply a stream of R' samples to the DAC 900, which DACs are shown in FIG. 2. If the de-interleaver 400 and the DACs 800 and 900 operate with serial-bit samples, rather than parallel-bit samples as presumed in FIG. 4, the rounding circuit 300 will be followed by a parallel-to-serial converter not shown in FIG. 4.

Figure 5:
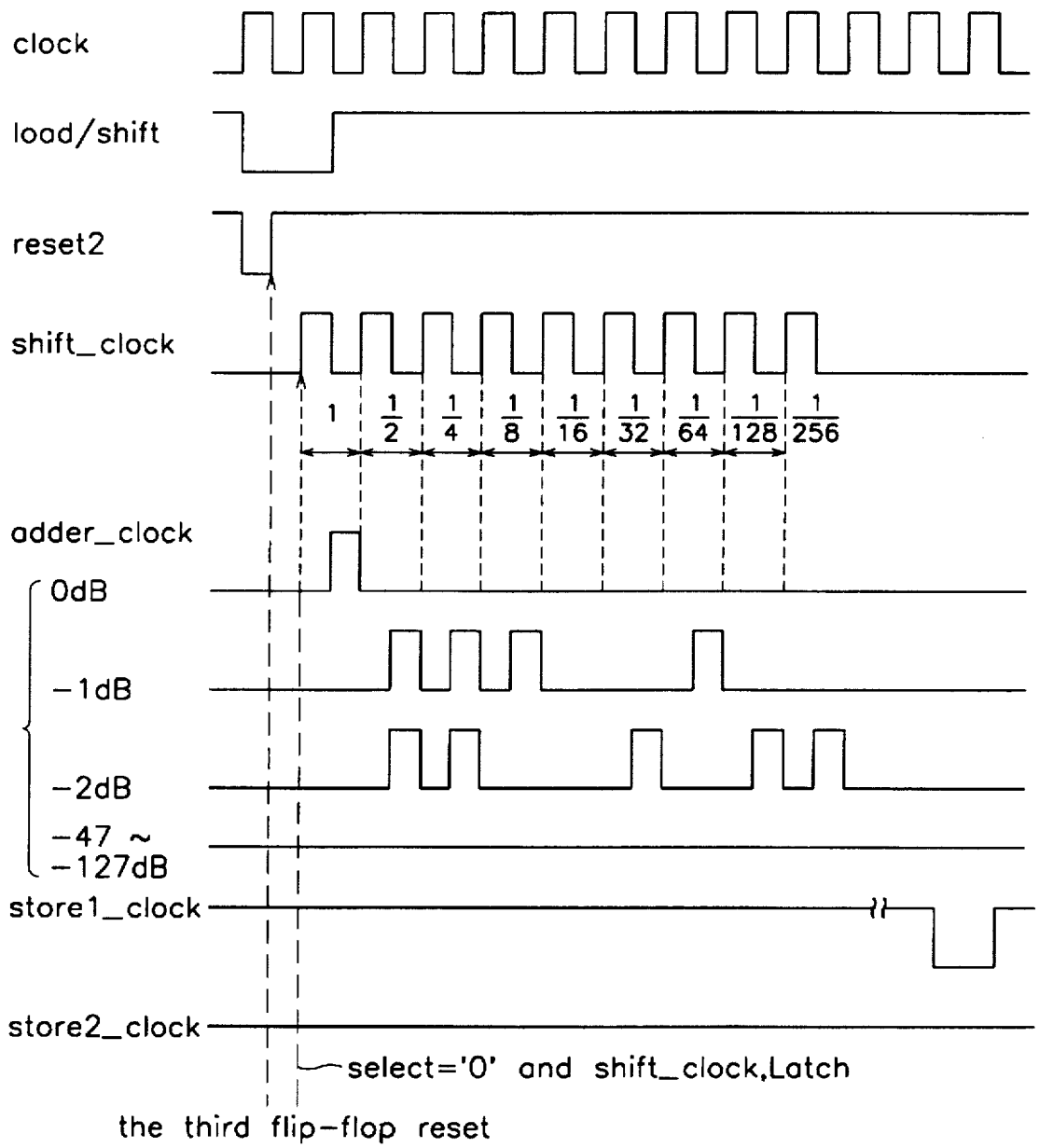
FIG. 5 is a timing diagram of the attenuation of input signals by the FIG. 4 APU by procedures of successive shifting and selective accumulation of the successively shifted input signals.
Figure 6:
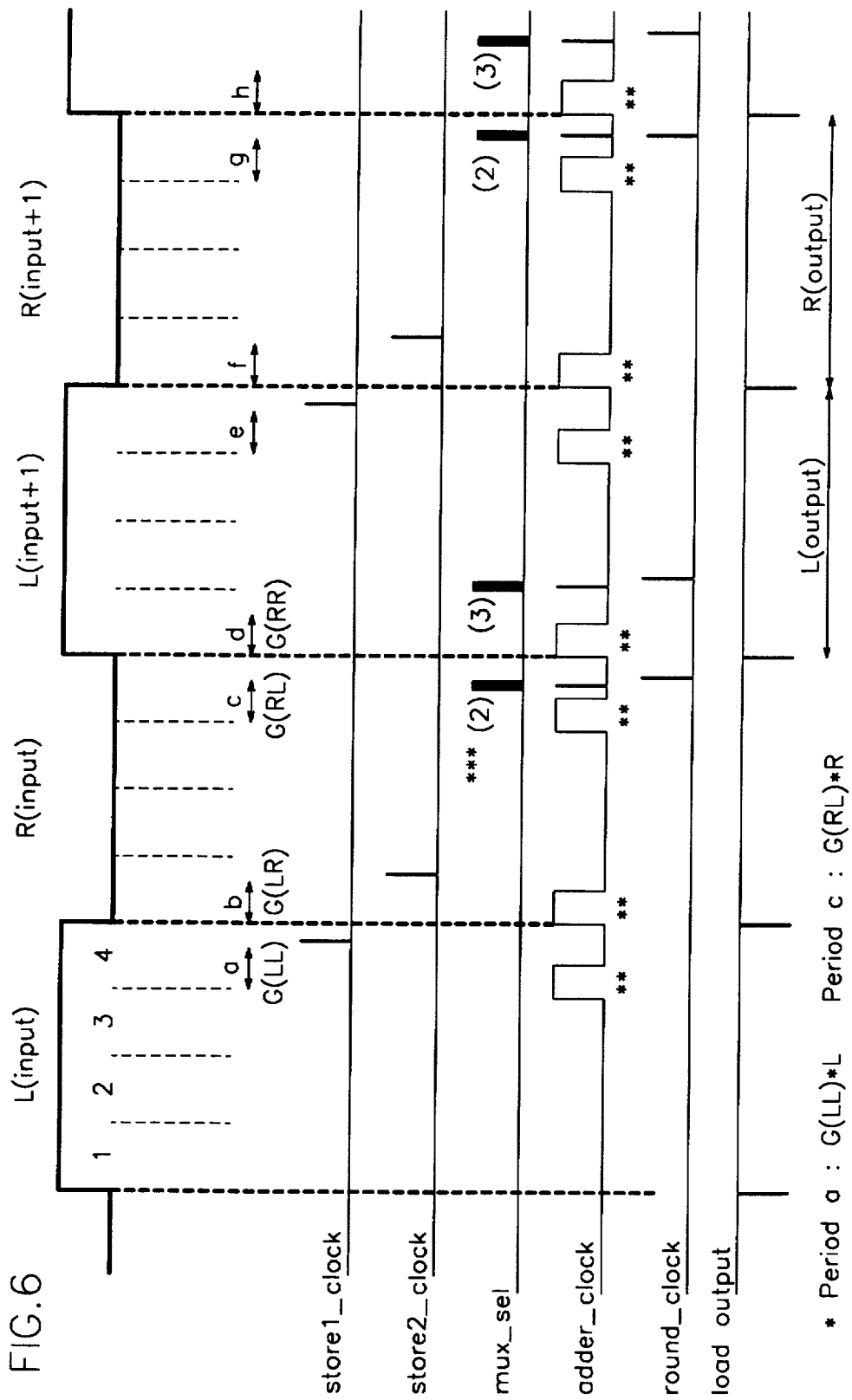
FIG. 6 is a timing diagram between input and output in the FIG. 4 APU.

Referring to FIGS. 4 to 6, first, assume that a decoded audio data sample having 20 bits is supplied to the attenuator 200. The data supplied to the attenuator 200 are latched to a shift register block 210 by the shift clock signal shift_clock when the selection signal load/shift applied to the shift register block 210 attains a low level. Simultaneously, the second reset-signal reset2 applied to first data latch 240 in the attenuator 200 attains a low level, so the first data latch 240 is reset to arithmetic zero, conditioning it to store a new accumulation result. Such an accumulation result can be obtained when the data loaded into the shift register block 210 as described above are multiplied by an attenuation coefficient by a shift and selectively accumulate procedure.

During the shift and selectively accumulate procedure the selection signal load/shift applied to the shift register block 210 is at high level when each shift clock occurs, causing the audio data stored in the shift register block 210 each to be shifted by one bit towards lowered significance. Accordingly, the audio signal is halved in amplitude with each 1-bit shift. That is, supposing the normalized relative amplitude of the L-channel or R-channel sample when loaded to be 1, the normalized relative amplitude of the sample is successively reduced to ½, ¼, ⅛, 1/16, 1/32, 1/64, 1/128, and 1/256 with each occurrence of the shift clock signal shift_clock. Accordingly, to achieve a desired attenuation, the shifted audio signal value is accumulated every time a ONE appears in the adder_clock signal applied to the data latch 240 from the attenuation coefficient signal generator 100. Although this method may not achieve the exactly desired attenuation, its error is smaller than the allowable error set by the green book.

FIG. 5 shows a variant from the described procedure that is possible if the sample is to be attenuated 0 dB, which variant operates in substantial (though not exact) accordance with the table of FIG. 3. The real binary attenuation codes stored in ROM within the attenuation coefficient signal generator 100 are extended by an additional, most significant bit (MSB) that occurs just after the shift register block 210 is loaded, which MSB is ONE for 0 dB attenuation level and is ZERO for all other attenuation levels. Rather than accumulating ½, ¼, ⅛, 1/16, 1/32, 1/64, 1/128, and 1/256 portions of the input sample to approximate a 0 dB attenuation with a real attenuation of 0.0340 dB using the real attenuation binary code 1111 1111, an extended real attenuation binary code 1 0000 0000 is supplied for 0 dB attenuation level. The first data latch 240 accumulates only the value of the data sample before attenuation procedures are implemented.

As described above, the APU can attenuate the audio signal by selectively accumulating proper values among relative amplitudes ½, ¼, ⅛, 1/16, 1/32, 1/128 and 1/256 until reaching the required attenuation of the audio signal. During the attenuation procedures. The attenuation coefficient signal generator 100 receives instruction concerning a required level of attenuation, and serially outputs the leading ZERO followed by the 8 bits descriptive of the real attenuation coefficient, which bits clock the accumulation of the desired fraction of the original data sample. By way of example, as shown in FIG. 5, the FIG. 4 APU selectively accumulates ½ to ¼, 1/32, 1/128, and 1/256 of the input sample to achieve an attenuation of −2 dB (actually, −2.015 dB), the data latch 240 temporarily storing an attenuated sample having an amplitude 0.79297 times that of the original sample when the cycle of selective accumulation is completed.

It is difficult for human hearing to sense an audio signal attenuated beyond −47 dB, so, in accordance with an all-ZERO adder_clock as shown in FIG. 5, the attenuation is infinite for levels −47 dB and lower. The data latch 240 accumulates nothing more than its initial amplitude of zero.

The contents temporarily stored in the data latch 240 when a cycle of selective accumulation is completed can be temporarily stored in the data latch 250 for addition to the contents temporarily stored in the data latch 240 when another cycle of selective accumulation is completed. The contents temporarily stored in the data latch 240 when a cycle of selective accumulation is completed can alternatively be temporarily stored in the data latch 260 for addition to the contents temporarily stored in the data latch 240 when another cycle of selective accumulation is completed. This facilitates mixing between the L and R channels being carried out in accordance with the following expressions.

$$L(\text{output}) = L(\text{input})*G(LL) + R(\text{input})*G(RL) \quad (3)$$

$$R(\text{output}) = R(\text{input})*G(RR) + L(\text{input})*G(LR) \quad (4)$$

By way of background, in ADPCM decoding, the ADPCM decoder supplies the de-compressed R channel output sample while loading and decoding the next compressed L channel input sample. And, the ADPCM decoder supplies the de-compressed L channel output sample while loading and decoding the next compressed R channel input sample. Staggered L and R samples are supplied alternately from the ADPCM decoder interleaved in time. The respective period each or R or L channel output sample is supplied extends over 48 clock cycles, the 48 clock cycles being apportioned within four quarter-periods. The ADPCM decoding is divided into three steps. The range operation is performed during the 12 clocks of the earliest-in-time first quarter-period, the operation multiplying a filter constant is performed during the 24 clock cycles of the next-in-time second and third quarter-periods. The ADPCM decoding is complete when the 12 clock cycles in the last-in-time fourth quarter period begin to occur. So, the operating procedures described by expressions (3) and (4) can be started when a fourth quarter-period begins.

FIG. 6 shows one order of carrying out the the four attenuation procedures using one attenuation circuit 200 on a time-shared basis, which order requires temporary storage in the data latches 250 and 260. Since R-channel as well as L-channel information is necessary for determining an L (output) signal sample in FIG. 6, the L (output) signal sample is delayed by two sample periods from the L (input) signal sample, to occur simultaneously with the succeeding L (input+1) signal sample. FIG. 6 shows the L-channel sample referred to as L(input) being multiplied by an attenuation coefficient G(LL) to generate the attenuator response G(LL)*L(input) starting at the be ginning of the unused fourth quarter-period a. When the cycle of selective shift and selective accumulation used to generate the attenuator response G(LL)*L(input) is completed, this response is stored in the second data latch 250 responsive to the first storing signal store1_clock. Then the FIG. 2 microprocessor 500 supplies the data latch 240 the second reset-signal reset2 to reset its contents to arithmetic zero.

The L-channel sample referred to as L(input) is subsequently re-loaded into the shift register block 210 to be multiplied by an attenuation coefficient G(LR) to generate the attenuator response G(LR)*L(input) during a time extending into the first quarter-period b when ranging for the succeeding R-channel sample referred to as R(input) is being done. To avoid having to use an additional 20-bit-wide data latch before the shift register block 210, it is preferred to re-load the shift register block 210 during one of the last clock cycles in the fourth quarter-period a. When the cycle of selective shift and selective accumulation used to generate the attenuator response G(LR)*L(input) is completed in the first quarter-period b, this response is stored in the second data latch 260 responsive to the second storing signal store2_clock. Then the FIG. 2 microprocessor 500 supplies the data latch 240 the second reset-signal reset2 to reset its contents to arithmetic zero.

FIG. 6 also shows a subsequent R-channel sample referred to as R(input) being multiplied by an attenuation coefficient G(RL) to generate the attenuator response G(RL)*R(input) starting at the beginning of the unused fourth quarter-period c. When the cycle of selective shift and selective accumulation used to generate the attenuator response G(RL)*R(input) is completed, the FIG. 2 microprocessor 500 supplies the multiplexer 220 a second selection signal mux_sel that selects the temporarily stored attenuator response G(LL)*L(input) from the data latch 250 for addition to the G(RL)*R(input) attenuator response from the data latch 240 when an extra ONE of adder_clock is applied to the data latch 240. Then, responsive to the round clock, the L(output) L(input)*G(LL)+R(input)*G(RL) sample in the data latch 240 is clocked forward into the rounding circuit 300 where the 20-bit sample is rounded to 16 bits. Then, the FIG. 2 microprocessor 500 supplies the data latch 240 the second reset-signal reset2 to reset its contents to arithmetic zero.

The R-channel sample referred to as R(input) is subsequently re-loaded into the shift register block 210 to be multiplied by an attenuation coefficient G(RR) to generate the attenuator response G(RR)*R(input) during a time extending into the first quarter-period d when ranging for the succeeding L-channel sample referred to as L(input+1) is being done. To avoid having to use an additional 20-bit-wide data latch before the shift register block 210, it is preferred to re-load the shift register block 210 during one of the last clock cycles in the fourth quarter-period c. After rounding to 16 bits in the rounding circuit 300, the L(output) sample is applied to the DAC 800 at the same time the L(input+1) sample is supplied to the attenuator 200.

When the cycle of selective shift and selective accumulation used to generate the attenuator response G(RR)*R (input) is completed, the FIG. 2 microprocessor 500 supplies the multiplexer 220 a second selection signal mux_sel that selects the temporarily stored attenuator response G(LR)*L (input) from the data latch 260 for addition to the G(RR) *R(input) attenuator response from the data latch 240 when an extra ONE of adder_clock is applied to the data latch 240. Then, responsive to the round_clock, the R(output)= R(input)*G(RR)+L(input)*G(LR) sample in the data latch 240 is clocked forward into the rounding circuit 300 where the 20-bit sample is rounded to 16 bits. Then, the FIG. 2 microprocessor 500 supplies the data latch 240 the second reset-signal reset2 to reset its contents to arithmetic zero. After rounding to 16 bits in the rounding circuit 300, the R(output) sample is applied to the DAC 900 at the same time the R(input+1) sample is supplied to the attenuator 200.

Figure 7:
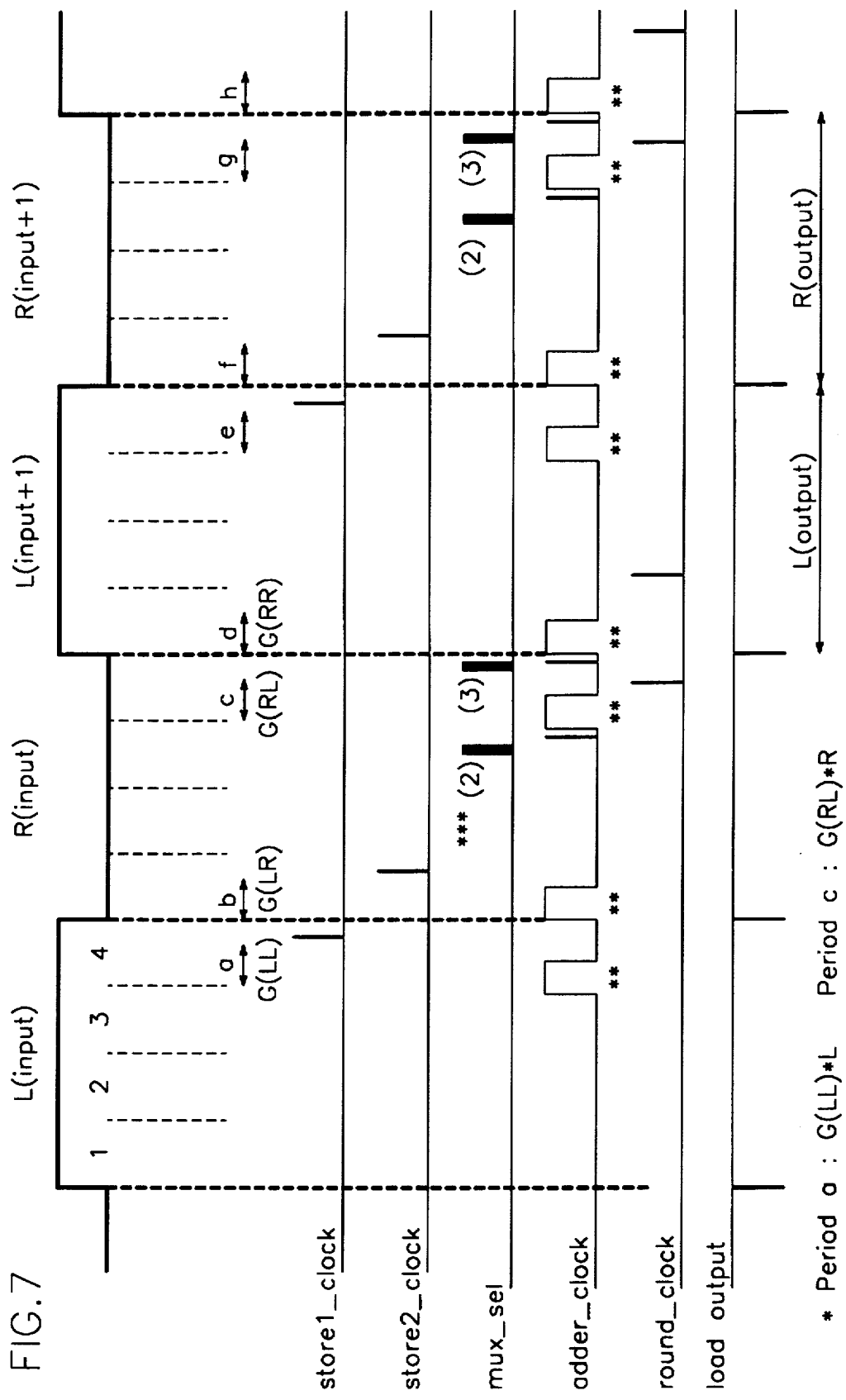
FIG. 7 is an alternative timing diagram between input and output in the FIG. 4 APU.

FIG. 7 shows operation of the FIG. 4 APU alternative to that shown in FIG. 6. In the operation shown in FIG. 7, the L(output) is not formed by adding the L(input)*G(LL) sample temporarily stored in the data latch 250 to the R(input)*G(RL) sample stored in the data latch 240 subsequent to the R(input) * G(RL) sample having been accumulated. Instead, the the L(input)*G(LL) sample temporarily stored in the data latch 250 is loaded into the data latch 240 before accumulating the R(input)*G(RL) component of the L(output). So, when accumulatiion of the R(input)*G (RL) component of the L(output) is completed, L(output) sample is stored in the data latch 240; and the L(output) sample can be clocked forward into the rounder circuitry 300 on the subsequent round_clock.

Also, in the operation shown in FIG. 7 the R(output) is not formed by adding the L(input)*G(LR) sample temporarily stored in the data latch 260 to the R(input)*G(RR) sample stored in the data latch 240 subsequent to the R(input) * G(RL) sample having been accumulated. Instead, the the L(input)*G(LR) sample temporarily stored in the data latch 260 is loaded into the data latch 240 before accumulating the R(input)*G(RR) component of the R(output). So, when accumulation of the R(input)*G(RR) component of the R(output) is completed, R(output) sample is stored in the data latch 240; and the R(output) sample can be clocked forward into the rounder circuitry 300 on the subsequent round_clock.

Figure 8:
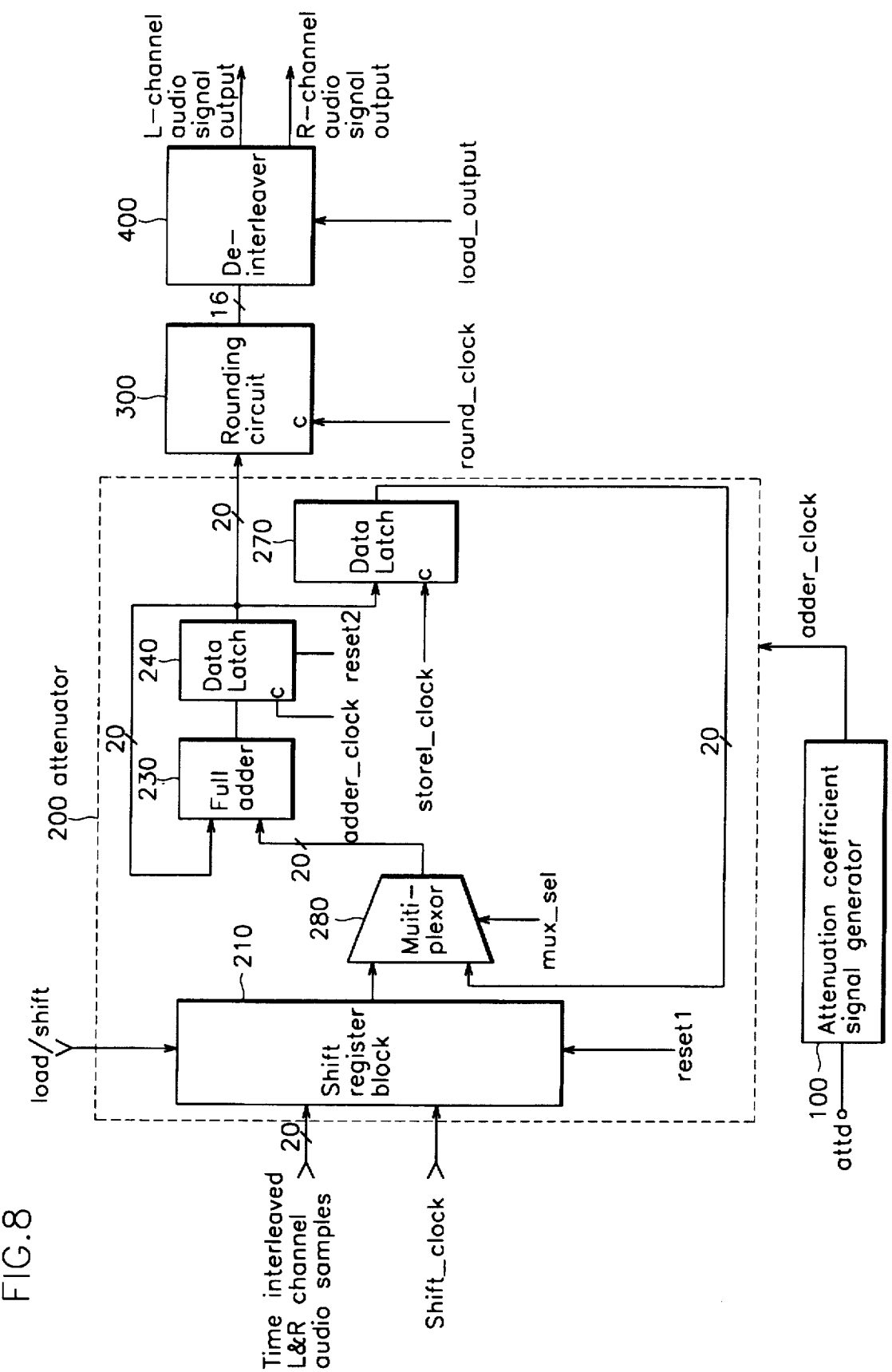
FIG. 8 is a block diagram of an APU for mixing L-channel and R-channel CD/CD-I audio signals in accordance with other preferred embodiments of the present invention.

FIG. 8 shows an audio processing unit that is a modification of the FIG. 4 APU, which modification replaces the data latches 250 and 260 with a single data latch 270 and replaces the three-input multiplexer 220 with a two-input multiplexer 280. This modification is feasible if the order of calculating the attenuation responses on a time share basis is G(LR), G(LL), G(RL), G(RR) rather than G(LL), G(LR), G(RL), G(RR).

Figure 9:
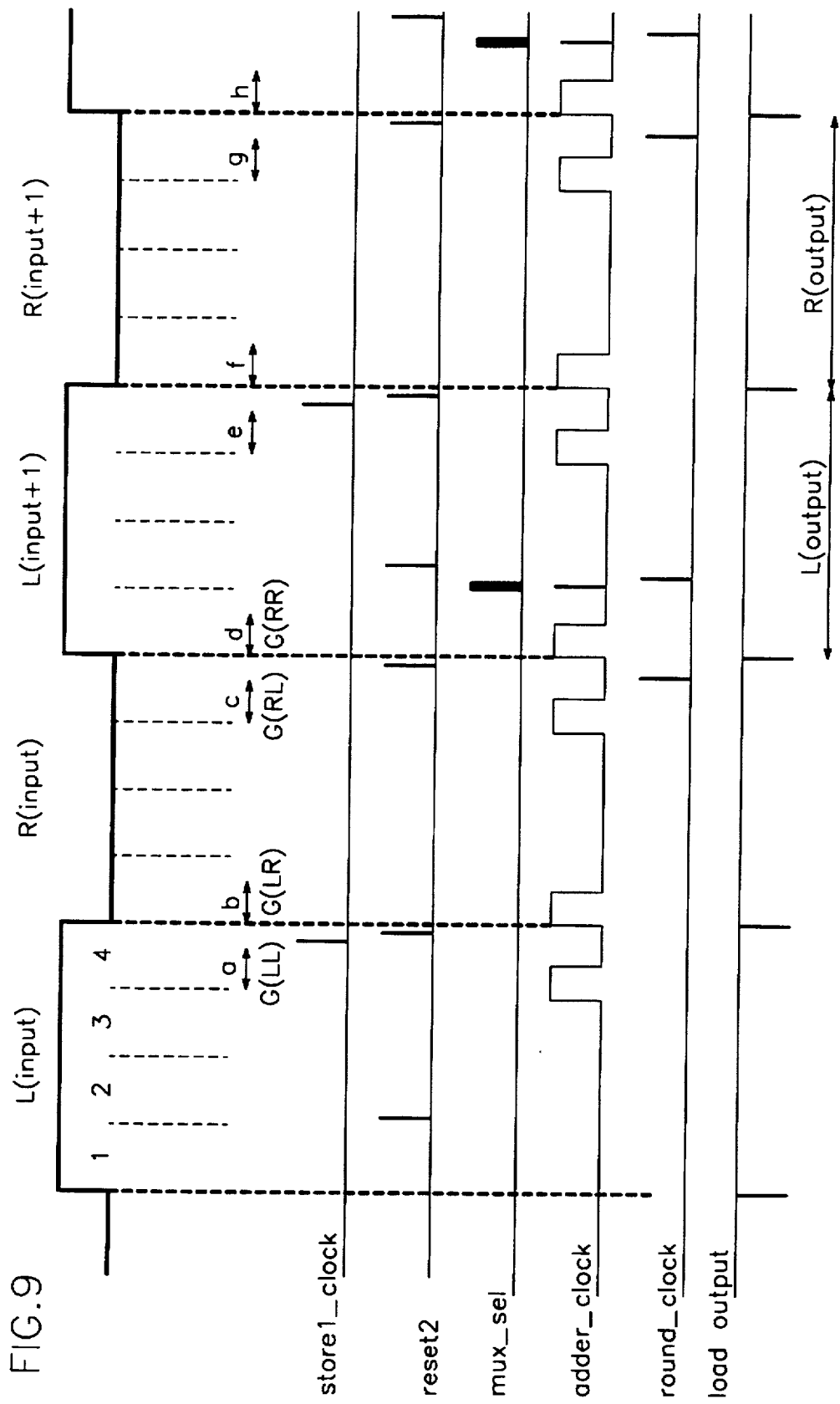
FIG. 9 is a timing diagram between input and output in the FIG. 8 APU.

FIG. 9 is a timing diagram for the FIG. 8 APU in which G(LR) is calculated before G(LL). The L-channel sample referred to as L(input) being multiplied by an attenuation coefficient G(LR) to generate the attenuator response G(LR)*L(input) starting at the beginning of the unused fourth quarter-period a. When the cycle of selective shift and selective accumulation used to generate the attenuator response G(LR)*L(input) is completed, this response is stored in the second data latch 270 responsive to the first storing signal store1_clock. Then the FIG. 2 microprocessor 500 supplies the data latch 240 the second reset-signal reset2 to reset its contents to arithmetic zero.

Calculating G(LR) before G(LL) allows the accumulation of G(RL) on top of the result of accumulating G(LL), rather than applying reset2 to the data latch 240 after accumulating G(LL). Responsive to the round_clock at the close of the R(input) period, the resulting L(output)=L(input)*G(LL)+R (input)*G(RL) sample in the data latch 240 is clocked forward into the rounding circuit 300 where the 20-bit sample is rounded to 16 bits. Then, the FIG. 2 microprocessor 500 supplies the data latch 240 the second reset-signal reset2 to reset its contents to arithmetic zero.

The R-channel sample referred to as R(input) is subsequently re-loaded into the shift register block 210 to be multiplied by an attenuation coefficient G(RR) to generate the attenuator response G(RR)*R(input) during a time extending into the first quarter-period d when ranging for the succeeding L-channel sample referred to as L(input+1) is being done. When the cycle of selective shift and selective accumulation used to generate the attenuator response G(RR)*R(input) is completed, the FIG. 2 microprocessor 500 supplies the multiplexer 280 a second selection signal mux_sel that selects the temporarily stored attenuator response G(LR)*L(input) from the data latch 270 for addition to the G(RR)*R(input) attenuator response from the data latch 240 when an extra ONE of adder_clock is applied to the data latch 240. Then, responsive to the round_clock, the R(output)=R(input)*G(RR)+L(input) * G(LR) sample in the data latch 240 is clocked forward into the rounding circuit 300 where the 20-bit sample is rounded to 16 bits. Then, the FIG. 2 microprocessor 500 supplies the data latch 240 the second reset-signal reset2 to reset its contents to arithmetic zero. After rounding to 16 bits in the rounding circuit 300, the R(output) sample is applied to the DAC 900 at the same time the R(input+1) sample is supplied to the attenuator 200.

Referring to FIGS. 10A, 10B, 10C, 10D and 10E, the shift register block 210 includes: a control-circuit 211 and first to fifth registers 212, 213, 214, 215 and 216 having the same construction, each of which registers receives the first reset signal reset1 and receives a respective four bits of a 20-bit L-channel or R-channel audio signal sample.

Figure 10A:
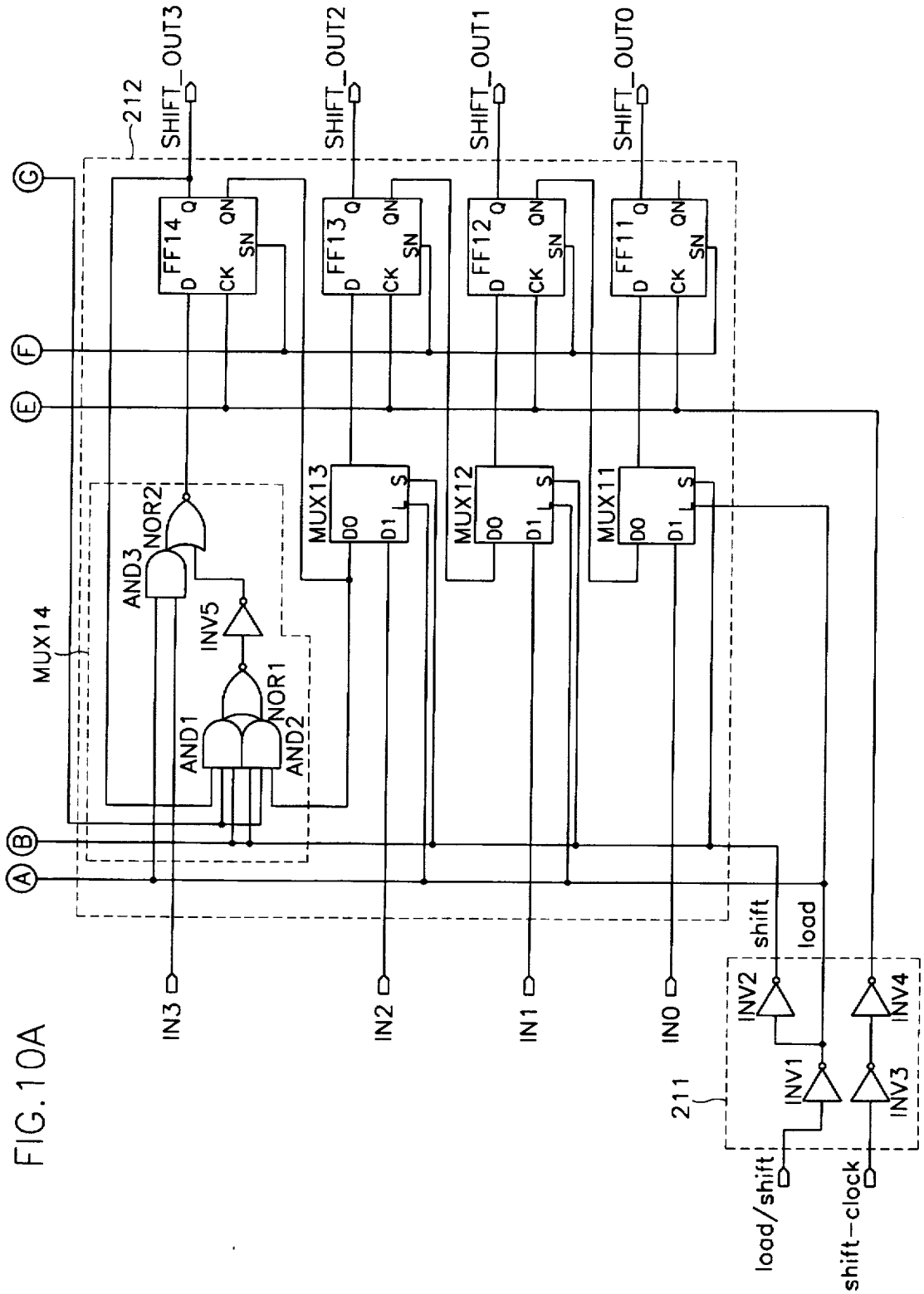

The control-circuit 211 shown in FIG. 10A includes a first inverter INV1 for generating a loading control signal load with improved driving capability in response to the first selection signal load/shift, a second inverter INV2 for generating a shift control signal shift with improved driving capability in response to first inverter INV1 output signal, and cascaded third and fourth inverters INV3, INV4 for receiving the shift clock signal shift_clock and supplying a shift clock signal with improved driving capability. The control-circuit 211 supplies the shift clock signal with improved driving capability to the first to fifth registers 212, 213, 214, 215 and 216. The control-circuit-211 also supplies the first to fifth registers 212, 213, 214, 215 and 216 a load or a shift control signal in response to the first selection signal load/shift.

The first register 212 shown in FIG. 10A includes first through fourth data flip-flops FF11, FF12, FF13 and FF14 supplying shift register output signals SHIFT_OUT0, SHIFT_OUT1, SHIFT_OUT2, and SHIFT_OUT3, respectively. The first register 212 also includes first through fourth multiplexers MUX11, MUX12, MUX13 and MUX14 for selecting respective bits to the data input D connections of the flip-flops FF11, F12, F13 and F14, respectively, to be clocked into the flip-flops FF11, F12, F13 and F14 responsive to the next shift_clock signal to determine the shift register output signals SHIFT_OUT0, SHIFT_OUT1, SHIFT_OUT2, and SHIFT_OUT3 until the next after shift_clock signal. Terminals A, B, E, F and G at the top of the first register 212 shown in FIG. 10A connect to terminals A, B, E, F and G at the bottom of the second register 213 shown in FIG. 10B.

Figure 10B:
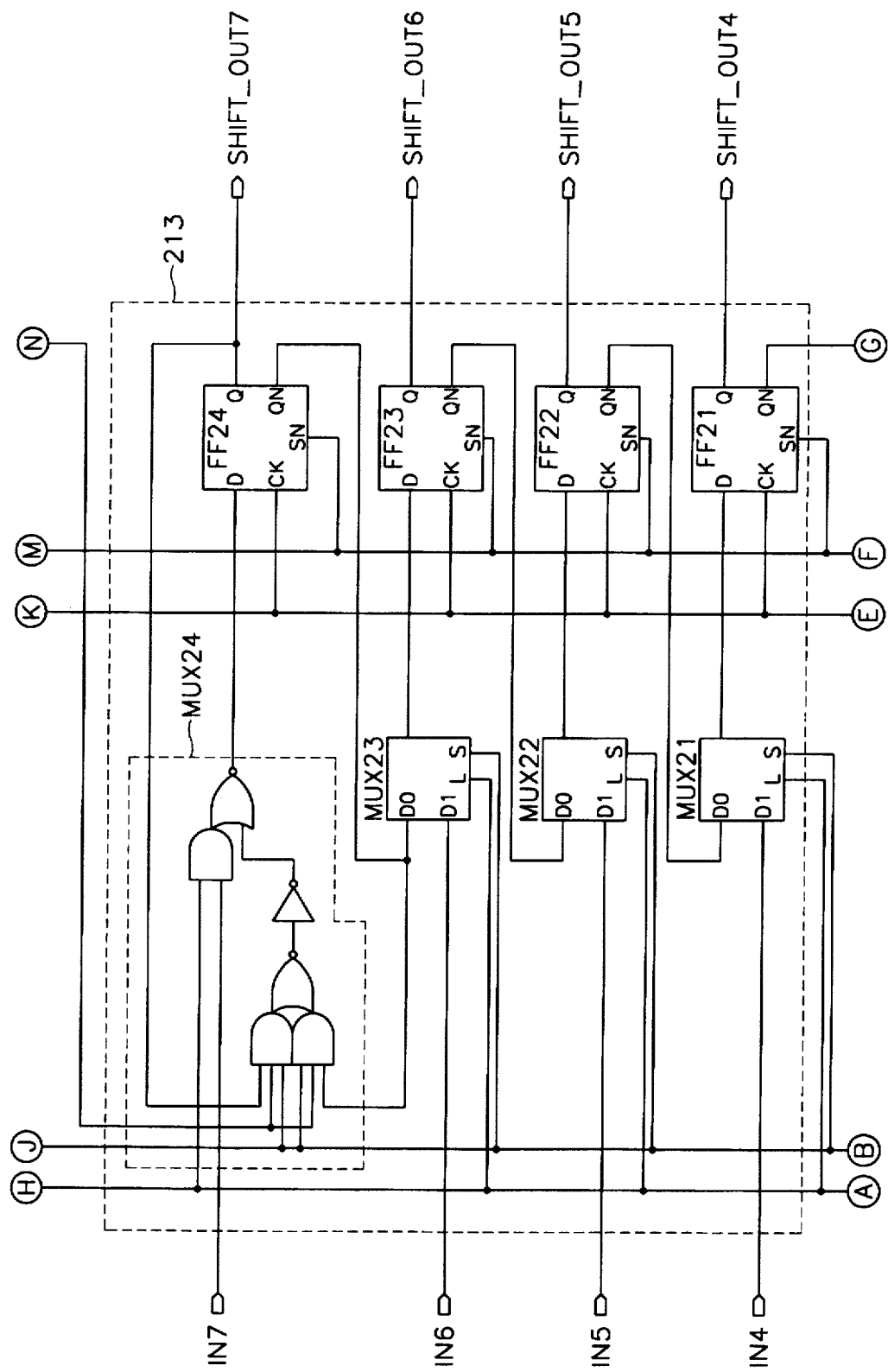

The second register 213 shown in FIG. 10B includes fifth through eighth data flip-flops FF21, FF22, FF23 and FF24 supplying shift register output signals SHIFT_OUT4, SHIFT_OUT5, SHIFT_OUT6, and SHIFT_OUT7, respectively. The second register 213 also includes fifth through eighth multiplexers MUX21, MUX22, MUX23 and MUX24 for selecting respective bits to the data input D connections of the flip-flops FF21, FF22, FF23 and FF24, respectively, to be clocked into the flip-flops FF21, FF22, FF23 and FF24 responsive to the next shift_clock signal to determine the shift register output signals SHIFT_OUT4, SHIFT_OUT5, SHIFT_OUT6, and SHIFT_OUT7 until the next after shift_clock signal. Terminals H, J, K, M and N at the top of the second register 213 shown in FIG. 10B connect to terminals H, J, K, M and N at the bottom of third register 214 shown in FIG. 10C.

Figure 10C:
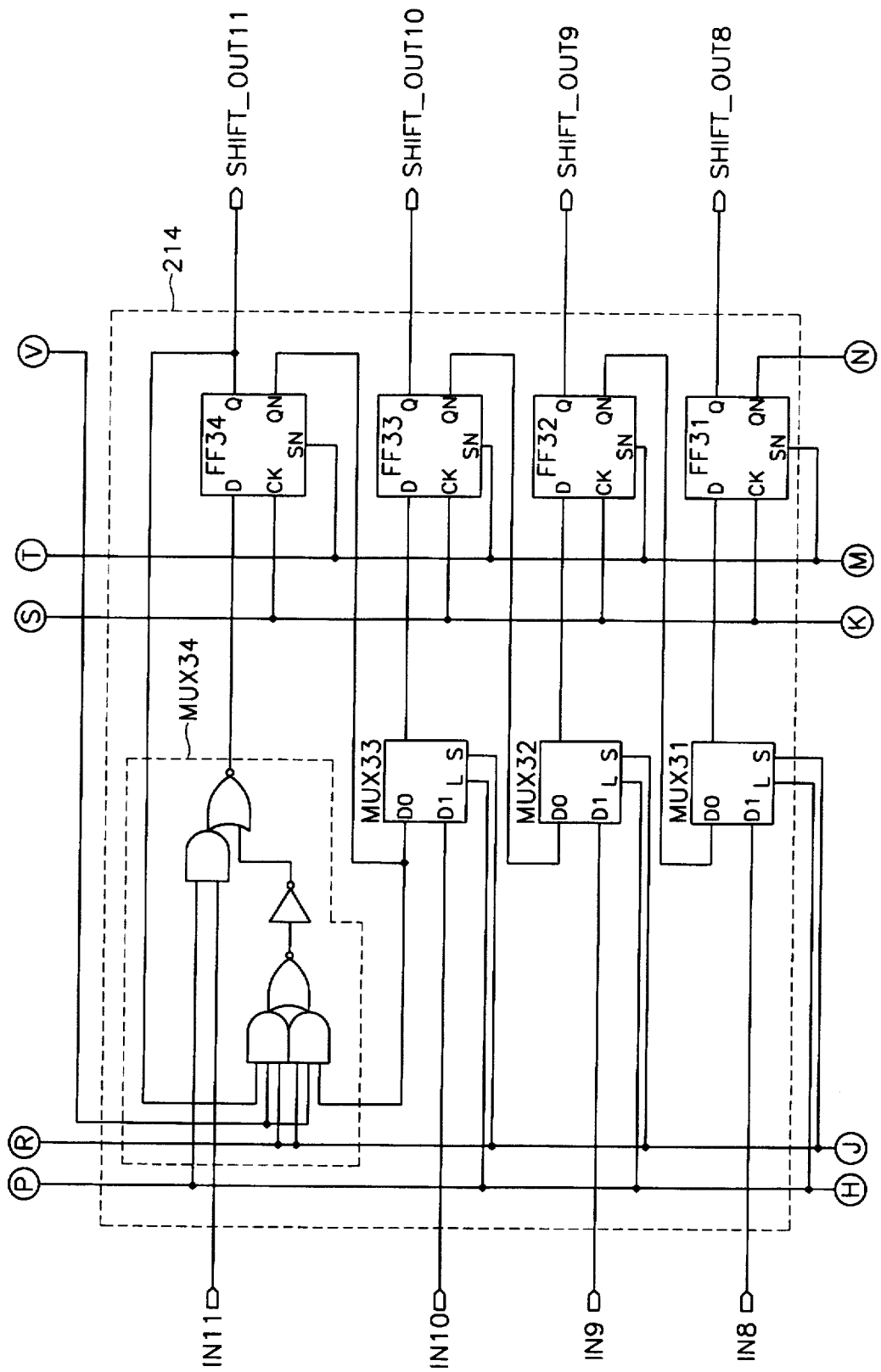

The third register 214 shown in FIG. 10C includes ninth through twelfth data flip-flops FF31, FF32, FF33 and FF34 supplying shift register output signals SHIFT_OUT8, SHIFT_OUT9, SHIFT_OUT10, and SHIFT_OUT11, respectively. The third register 214 also includes ninth through twelfth multiplexers MUX31, MUX32, MUX33 and MUX34 for selecting respective bits to the data input D connections of the flip-flops FF31, FF32, FF33 and FF34, respectively, to be clocked into the flip-flops FF31, FF32, FF33 and FF34 responsive to the next shift_clock signal to determine the shift register output signals SHIFT_OUT8, SHIFT_OUT9, SHIFT_OUT10, and SHIFT_OUT11 until the next after shift_clock signal. Terminals P, R, T, U and V at the top of the third register 214 shown in FIG. 10C connect to terminals P, R, $, T and U at the bottom of the fourth register 215 shown in FIG. 10D.

The fourth register 215 shown in FIG. 10D includes thirteenth through sixteenth data flip-flops FF41, FF42, FF43 and FF44 supplying shift register output signals SHIFT_OUT12, SHIFT_OUT13, SHIFT_OUT14, and SHIFT_OUT15, respectively. The fourth register 215 also includes thirteenth through sixteenth multiplexers MUX41, MUX42, MUX43 and MUX44 for selecting respective bits to the data input D connections of the flip-flops FF41, FF42, FF43 and FF44, respectively, to be clocked into the flip-flops FF41, FF42, FF43 and FF44 responsive to the next shift_clock signal to determine the shift register output signals SHIFT_OUT12, SHIFT_OUT13, SHIFT_OUT14, and SHIFT_OUT15 until the next after shift_clock signal. Terminals V, W, X, Y and Z at the top of the fourth register 215 shown in FIG. 10D connect to terminals V, W, X, Y and Z at the bottom of the fifth register 216 shown in FIG. 10E.

Figure 10E:
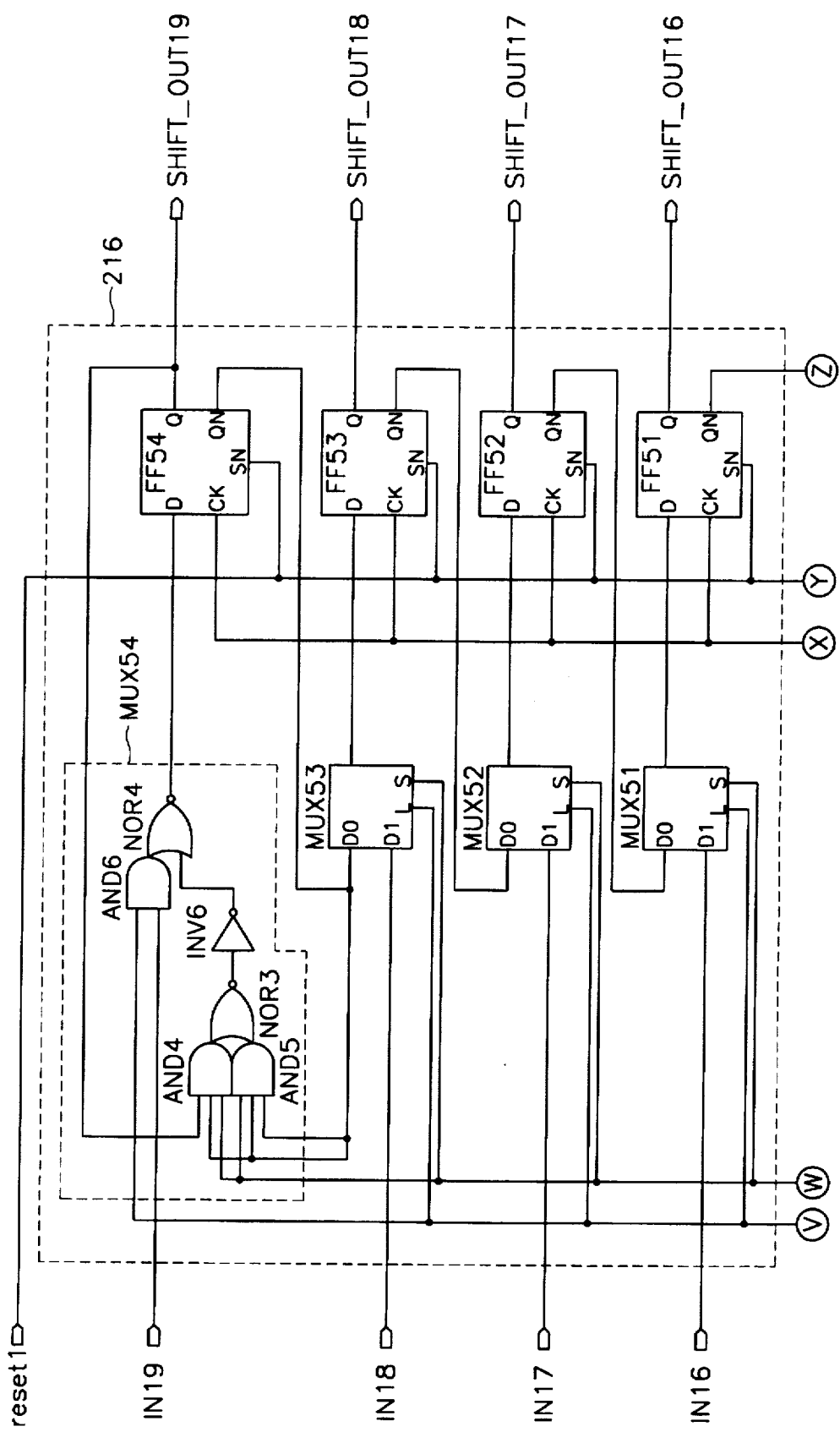

The fifth register 216 shown in FIG. 10E includes seventeenth through twentieth data flip-flops FF51, FF52, FF53 and FF54 supplying shift register output signals ST_OUT16, SHIFT_OUT17, SHIFT_OUT18, and SHIFT_OUT19, respectively. The fifth register 216 also includes seventeenth through twentieth multiplexers MUX51, MUX52, MUX53 and MUX54 for selecting respective bits to the data input D connections of the flip-flops FF51, FF52, FF53 and FF54, respectively, to be clocked into the flip-flops FF51, FF52, FF53 and FF54 responsive to the next shift_clock signal to determine the shift register output signals SHIFT_OUT16, SHIFT_OUT17, SHIFT_OUT18, and SHIFT_OUT19 until the next after shift clock signal.

Responsive to the loading control signal load being high and the shift control signal shift being low, the first through fourth multiplexers MUX11, MUX12, MUX13 and MUX14 select first through fourth bitplaces IN0, IN1, IN2 and IN3 of the digital audio input signal to the data input D connections of the flip-flops FF11, F12, F13 and F14 respectively. The fifth through eighth multiplexers MUX21, MUX22, MUX23 and MUX24 select fifth through eighth bitplaces IN4, IN5, IN6 and IN7 of the digital audio input signal to the data input D connections of fifth through eighth data flip-flops FF21, FF22, FF23 and FF24 respectively. The ninth through twelfth multiplexers MUX31, MUX32, MUX33 and MUX34 select ninth through twelfth bitplaces IN8, IN9, IN10 and IN11 of the digital audio input signal to the data input D connections of the ninth through twelfth data flip-flops FF31, FF32, FF33 and FF34 respectively. The thirteenth through sixteenth multiplexers MUX41, MUX42, MUX43 and MUX44 select thirteenth through sixteenth bitplaces IN12, IN13, IN14 and IN15 of the digital audio input signal to the data input D connections of the thirteenth through sixteenth data flip-flops FF41, FF42, FF43 and FF44 respectively. The seventeenth through twentieth multiplexers MUX51, MUX52, MUX53 and MUX54 select seventeenth through twentieth bitplaces IN16, IN17, IN18 and IN19 of the digital audio input signal to the data input D connections of the seventeenth through twentieth data flip-flops FF51, FF52, FF53 and FF54 respectively.

Responsive to the loading control signal load being low and the shift control signal shift being high, the first through fourth multiplexers MUX11, MUX12, MUX13 and MUX14 select the inverted output signals QN from the second through fifth data flip-flops FF12, F13, F14 and F21 to the data input D connections of the flip-flops FF11, F12, F13 and F14 respectively. The fifth through eighth multiplexers MUX21, MUX22, MUX23 and MUX24 select the inverted output signals QN from the sixth through ninth data flip-flops FF22, F23, F24 and F31 to the data input D connections of fifth through eighth data flip-flops FF21, FF22, FF23 and FF24 respectively. The ninth through twelfth multiplexers MUX31, MUX32, MUX33 and MUX34 select the inverted output signals QN from the tenth through thirteenth data flip-flops FF32, F33, F34 and F41 to the data input D connections of the ninth through twelfth data flip-flops FF31, FF32, FF33 and FF34 respectively. The thirteenth through sixteenth multiplexers MUX41, MUX42, MUX43 and MUX44 select the inverted output signals QN from the fourteenth through seventeenth data flip-flops FF42, F43, F44 and F41 to the data input D connections of the thirteenth through sixteenth data flip-flops FF41, FF42, FF43 and FF44 respectively. The seventeenth through nineteenth multiplexers MUX51, MUX52 and MUX53 select the inverted output signals QN from the eighteenth through twentieth data flip-flops FF52, F53, and F54 to the data input D connections of the seventeenth through nineteenth data flip-flops FF51, FF52, and FF53 respectively. The twentieth multiplexer MUX54 continues to select the twentieth audio signal IN19 to the data input D connection of the twentieth data flip-flop F54 to provide sign bit extension.

The connections of the fourth multiplexer MUX14 shown in detail in FIG. 10A will be particularly described, since the connections are typical of the connections of the first through fourth multiplexers MUX11, MUX12, MUX13 and MUX14; the fifth through eighth multiplexers MUX21, MUX22, MUX23 and MUX24; the ninth through twelfth multiplexers MUX31, MUX32, MUX33 and MUX34; the thirteenth through sixteenth multiplexers MUX41, MUX42, MUX43 and MUX44; and the seventeenth through nineteenth multiplexers MUX51, MUX52 and MUX53. The fourth multiplexer MUX14 includes 3-input AND gates AND1 and AND2, a 2-input AND gate AND3 receptive of the loading control signal load and the fourth bitplace IN3 of the digital audio input signal as respective input signals, a 2-input NOR gate NOR1 receptive of the responses of the AND gates AND1 and AND2 as respective input signals, a logic inverter (NOT gate) INV5 for bit-complementing the NOR gate NOR1 response to obtain an OR response to the responses of the AND gates AND1 and AND2, and another 2-input NOR gate NOR2 receptive of the responses of the AND gate AND3 and the logic inverter INV5 as respective input signals to generate as its respective response the output signal of the MUX14 applied as the data input signal for the fourth flip-flop FF14 in the first shift register 212. The output signal Q and the inverted output signal QN of the fourth flip-flop FF14 that the MUX14 supplies the data input signal to are applied as first inputs to the AND gates AND1 and AND2, respectively. An inverted output signal QN of the fifth flip-flop FF21 in the second shift register 213 (i. e., the flip-flop in the preceding stage of the the shift register block 210) is applied as a second input to each of the AND gates AND1 and AND2. The third input to each of the AND gates AND1 and AND2 is the shift control signal shift supplied from the inverter INV2 in the control-circuit 211.

The input connection to the AND gate AND3 receiving the the fourth audio signal IN3 corresponds functionally to the input connection DO of the multiplexers multiplexers MUX11, MUX12, MUX13, MUX21, MUX22, MUX23, MUX24, MUX31, MUX32, MUX33, MUX34, MUX41, MUX42, MUX43, MUX44, MUX51, MUX52 and MUX53. When the loading control signal load is high and the shift control signal shift is low, the loading control signal load being high causes the AND gate AND3 response to conform to the fourth bitplace IN3 of the digital audio input signal. The shift control signal shift being low causes the responses of the AND gates AND1 and AND2 both to be low. Consequently, the NOR gate NOR1 response is high and the logic inverter INV5 response is low, conditioning the NOR gate NOR2 response to conform to the AND gate AND3 response and thus to the fourth bitplace IN3 of the digital audio input signal. At the next shift_clock signal the fourth flip-flop FF14 output signal Q replicates the fourth bitplace IN3 of the digital audio input signal as the fourth bitplace SHIFT_OUT3 of the loaded digital audio signal.

When the loading control signal load is low and the shift control signal shift is high, the loading control signal load being low causes the AND gate AND3 response to be low irrespective of the fourth bitplace IN3 of the digital audio input signal, conditioning the NOR gate NOR2 response to conform to the logic inverter INV5 response. If the complemented QN output signal from the fifth flip-flop FF21 applied as second inputs to the AND gates AND1 and AND2 is low, the AND gates AND1 and AND2 both generate a low output, the NOR gate NOR1 response is high, and the logic inverter INV5 response is low. Since both its input signals are low, the NOR gate NOR2 response applied to the D data input of the fourth flip-flop FF14 is high. At the next shift_clock signal the fourth flip-flop FF14 output signal Q becomes high, just like the previous fifth flip-flop FF21 output signal Q. The fourth bitplace SHIFT_OUT3 of the attenuated digital audio signal replicates the previous fifth flip-flop FF21 output signal Q.

The first inputs to the AND gates AND1 and AND2 are complementary to each other, being the Q output signal and complemented QN output signal from the fourth flip-flop FF14 respectively. So, if the complemented QN output signal from the fifth flip-flop FF21 applied as second inputs to the AND gates AND1 and AND2 is high and the inverted shift control signal shift is high, one of the AND gates AND1 and AND2 will have three high inputs and will generate a high output. Consequently, the NOR gate NOR1 response is low, and the logic inverter INV5 response is high. Since one of its input signals is high, the NOR gate NOR2 response applied to the D data input of the fourth flip-flop FF14 is low. At the next shift_clock signal the fourth flip-flop FF14 output signal Q becomes low, just like the previous fifth flip-flop FF21 output signal Q. The fourth bitplace SHIFT_OUT3 of the attenuated digital audio signal replicates the previous fifth flip-flop FF21 output signal Q.

The twentieth multiplexer MUX53 includes 3-input AND gates AND4 and AND5, a 2-input AND gate AND6 receptive of the loading control signal load and the twentieth bitplace IN19 of the digital audio input signal as respective input signals, a 2-input NOR gate NOR3 receptive of the responses of the AND gates AND4 and AND5 as respective input signals, a logic inverter (NOT gate) INV6 for bit-complementing the NOR gate NOR3 response to obtain an OR response to the responses of the AND gates AND4 and AND5, and another 2-input NOR gate NOR4 receptive of the responses of the AND gate AND6 and the logic inverter INV6 as respective input signals to generate as its respective response the output signal of the MUX53 applied as the data input signal for the twentieth flip-flop FF54 in the fifth shift register 216. The output signal Q and the inverted output signal QN of the twentieth flip-flop FF54 that the MUX53 supplies the data input signal to are applied as first inputs to the AND gates AND4 and AND5, respectively; and the inverted output signal QN of the twentieth flip-flop FF54 is also applied as a second input to each of the AND gates AND4 and AND5 to implement sign-bit extension during shifting. The third input to each of the AND gates AND4 and AND5 is the shift control signal shift supplied from the inverter INV2 in the FIG. 10A control-circuit 211.

When the loading control signal load is high and the shift control signal shift is low, the loading control signal load being high causes the AND gate AND6 response to conform to the twentieth bitplace IN19 of the digital audio input signal. The shift control signal shift being low causes the responses of the AND gates AND4 and AND5 both to be low. Consequently, the NOR gate NOR3 response is high and the logic inverter INV6 response is low, conditioning the NOR gate NOR4 response to conform to the AND gate AND6 response and thus to the twentieth bitplace IN19 of the digital audio input signal. At the next shift_clock signal the twentieth flip-flop FF54 output signal Q reproduces the twentieth bitplace IN19 of the digital audio signal as the twentieth bitplace SHIFT_OUT19 of the loaded digital audio signal.

When the loading control signal load is low and the shift control signal shift is high, the loading control signal load being low causes the AND gate AND6 response to be low irrespective of the twentieth bitplace IN19 of the digital audio input signal, conditioning the NOR gate NOR4 response to conform to the logic inverter INV6 response.

Suppose the inverted output signal QN of the twentieth flip-flop FF54 is low, on one hand, owing to the two's complement digital audio input signal being negative, so the output signal Q of the twentieth flip-flop FF54 is high. Then, the AND gates AND4 and AND5 both generate a low output, the NOR gate NOR3 response is high, and the logic inverter INV6 response is low. Since both its input signals are low, the NOR gate NOR4 response applied to the D data input of the twentieth flip-flop FF54 is high. After the shift_clock signal the output signal Q of the twentieth flip-flop FF54 continues to be high, providing for sign bit extension of the negative attenuated digital audio sample supplied from the shift register block 210 as output signal to the multiplexer 220.

Suppose the inverted output signal QN of the twentieth flip-flop FF54 is high, on the other hand, owing to the two's complement digital audio input signal being positive, so the output signal Q of the twentieth flip-flop FF54 is low. AND gate AND5 response is high responsive to the inverted output signal QN of the twentieth flip-flop FF54 applied to the first and second inputs of the AND gate AND5 being high and the shift control signal shift applied to the third input of the AND gate AND5 being high. Consequently, the NOR gate NOR3 response is low, and the logic inverter INV6 response is high. Since one of its input signals is high, the NOR gate NOR4 response applied to the D data input of the twentieth flip-flop FF54 is low. After the shift_clock signal the output signal Q of the twentieth flip-flop FF54 continues to be low, providing for sign bit extension of the positive attenuated digital audio sample supplied from the shift register block 210 as output signal to the multiplexer 220.

The twentieth multiplexer MUX53 is subject to logic reduction, of course, but this is not done in FIG. 10E, so that the fifth register 216 can have the same construction on a silicon integrated-circuit die as the first to fourth registers 212, 213, 214 and 215.

What is claimed is:

1. An audio processing unit for controllably mixing left-channel and right-channel responses to a digital audio signal supplied in accordance with a given compact-disk audio signal standard, the controllable mixing being done in response to eight-bit indications of left-input-to-left-output gain G(LL), left-input-to-right-output gain G(LR), right-input-to-right-output gain G(RR) and right-input-to-left-output gain G(RL) also supplied in accordance with said compact-disk audio signal standard, said audio processing unit comprising:

an audio-processing-unit input connection for receiving time-interleaved alternate samples of the left-channel and right-channel portions of said digital audio signal supplied in accordance with said compact-disk audio signal standard;

an attenuation coefficient signal generator responsive to said eight-bit indications of left-input-to-left-output gain G(LL), left-input-to-right-output gain G(LR), right-input-to-right-output gain G(RR) and right-inputto-left-output gain G(RL) for generating actual attenuation coefficients supplied in serial-bit form;

circuitry for sequentially performing a first successive-shift-and selective-accumlation procedure and a second succesive-shift-and-selective-accumulation procedure on each of said time-interleaved alternate samples of the left-channel and right-channel portions of said digital audio signal received at said audio-processing-unit input connection, said first succesive-shift-and-selective-accumulation procedure generating a first accumulation result, and said second successive-shift-and-selective accumulation procedure generating a second accumulation result;

first additive combining circuitry for additively combining one of said first and second accumulation results for each sample of the left-channel portion of said digital audio signal with said first accumulation result for the succeeding sample of the right-channel portion of said digital audio signal to generate a successive sample of controllably mixed L-channel response; and second additive combining circuitry for additively combining the other of said first and second accumulation results for each samples of the left-channel portion of said digital audio signal with said second accumultion result for the succeeding sample of the right-channel portion of said digital audio signal to generate a successive sample of controllably mixed R-channel response;

wherein said attenuation coefficient signal generator supplies said G(LL) actual attenuation coefficient during said first successive-shift-and-selective-accumulation procedure on each left-channel sample of said digital audio signal, said G(LR) actual attenuation coefficient during said second successive-shift-and-selective-accumulation procedure on each right-channel sample of said digital audio signal, and said G(RR) actual attenuation coefficient during said second successive-shift-and-selective-accumulation procedure on each left-channel sample of said digital audio signal.

2. An audio processing unit as set forth in claim 1, wherein said attenuation coefficient signal generator generates said actual attenuation coefficients responsive to said eight-bit indications of left-input-to-left-output gain G(LL), left-input-to-right-output gain G(LR), right-input-to-right-output gain G(RR) and right-input-to-left-output gain G(RL) in at least substantial accordance with the following table:

| Required attenuation | Standardized value | Attenuation (binary code) | Attenuation (DB) |
|---|---|---|---|
| 0 DB | 1.000000 → | 11111111 → | −0.0340 DB |
| −1 DB | 0.891251 → | 11100100 → | −1.0061 DB |
| −2 DR | 0.794328 → | 11001011 → | −2.0149 DB |
| −3 DB | 0.707946 → | 10110101 → | −3.0112 DB |
| −4 DB | 0.630957 → | 10100001 → | −4.0283 DB |
| −5 DB | 0.562341 → | 10001111 → | −5.0581 DB |
| −6 DB | 0.501187 → | 10000000 → | −6.0206 DB |
| −7 DB | 0.446684 → | 01110010 → | −7.0267 DB |
| −8 DB | 0.398107 → | 01100101 → | −8.0784 DB |
| −9 DB | 0.354813 → | 01011010 → | −9.0799 DB |
| −10 DB | 0.316228 → | 01010000 → | −10.1030 DB |
| −11 DB | 0.281838 → | 01001000 → | −11.0181 DB |
| −12 DB | 0.251189 → | 0.1000000 → | −12.0412 DB |
| −13 DB | 0.223872 → | 00111001 → | −13.0473 DB |
| −14 DB | 0.199526 → | 00110011 → | −14.0134 DB |
| −15 DB | 0.177828 → | 00101101 → | −15.1005 DB |
| −16 DB | 0.158489 → | 00101000 → | −16.1236 DB |

-continued

| Required attenuation | Standardized value | Attenuation (binary code) | Attenuation (DB) | |
|---|---|---|---|---|
| −17 DB | 0.141254 → | 00100100 → | −17.0387 DB | |
| −18 DB | 0.125893 → | 00100000 → | −18.0618 DB | |
| −19 DB | 0.112202 → | 00011100 → | −19.2216 DB | |
| −20 DB | 0.100000 → | 00011001 → | −20.2060 DB | |
| −21 DB | 0.089125 → | 00010110 → | −21.3163 DB | |
| −22 DB | 0.079433 → | 00010100 → | −22.1442 DB | |
| −23 DB | 0.070795 → | 00010010 → | −23.0593 DB | |
| −24 DB | 0.063096 → | 00010000 → | −24.0824 DB | |
| −25 DB | 0.056234 → | 00001110 → | −25.2422 DB | |
| −26 DB | 0.050119 → | 00001100 → | −26.5812 DB | |
| −27 DB | 0.044665 → | 00001011 → | −27.3369 DB | |
| −28 DB | 0.039811 → | 00001010 → | −28.1648 DB | |
| −29 DB | 0.035481 → | 00001001 → | −29.0799 DB | |
| −30 DB | 0.031623 → | 00001000 → | −30.1030 DB | |
| −31 DB | 0.028184 → | 00000111 → | −31.2628 DB | |
| −32 DB | 0.025119 → | 00000110 → | −32.6018 DB | |
| −33 DB | 0.022387 → | 00000101 → | −34.1854 DB | |
| −34 DB | 0.019953 → | 00000101 → | −34.1854 DB | |
| −35 DB | 0.017783 → | 00000100 → | −36.1236 DB | |
| −36 DB | 0.015849 → | 00000100 → | −36.1236 DB | |
| −37 DB | 0.014125 → | 00000011 → | −386224 DB | |
| −38 DB | 0.012589 → | 00000011 → | −38.6224 DB | |
| −39 DB | 0.011220 → | 00000010 → | −42.1442 DB | |
| −40 DB | 0.010000 → | 00000010 → | −42.1442 DB | |
| −41 DB | 0.008913 → | 00000010 → | −42.1442 DB | |
| −42 DB | 0.007943 → | 00000010 → | −42.1442 DB | |
| −43 DB | 0.007079 → | 00000001 → | −48.1648 DB | |
| −44 DB | 0.006310 → | 00000001 → | −48.1648 DB | |
| −45 DB | 0.005623 → | 00000001 → | −48.1648 DB | |
| −46 DB | 0.005012 → | 00000001 → | −48.1648 DB | |
| −47 DB | 0.004467 → | 00000001 → | −48.1648 DB | |
| −48 DB | 0.003981 → | 00000001 → | −48.1648 DB | |
| −49 DB | 0.003548 → | 00000000 → | −Inf DB | |
| −50 DB | 0.003162 → | 00000000 → | −Inf DB | |
| −51 DB | 0.002818 → | 00000000 → | −Inf DB | |
| −52 DB | 0.002512 → | 00000000 → | −Inf DB | |
| −53 DB | 0.002239 → | 00000000 → | −Inf DB | |
| −54 DB | 0.001995 → | 00000000 → | −Inf DB | |
| −55 DB | 0.001778 → | 00000000 → | −Inf DB | |
| −56 DB | 0.001585 → | 00000000 → | −Inf DB | infinite attenuation. |
| −57 DB | 0.001413 → | 00000000 → | −Inf DB | |
| −58 DB | 0.001259 → | 00000000 → | −Inf DB | |
| −59 DB | 0.001122 → | 00000000 → | −Inf DB | |
| −60 DB | 0.001000 → | 00000000 → | −Inf DB | |
| −61 DB | 0.000891 → | 00000000 → | −Inf DB | |
| −62 DB | 0.000794 → | 00000000 → | −Inf DB | |
| −63 DB | 0.000708 → | 00000000 → | −Inf DB | |
| −64 DB | 0.000631 → | 00000000 → | −Inf DB | |
| −65 DB | 0.000562 → | 00000000 → | −Inf DB | |
| ⋮ | ⋮ | ⋮ | ⋮ | |
| −127 DB | 0.000000 → | 00000000 → | −Inf DB | |

3. An audio processing unit as set forth in claim 2, wherein said attenuation coefficient signal generator supplies said actual attenuation coefficients in serial-bit form most significant bit first.

4. An audio processing unit as set forth in claim 1, wherein said attenuation coefficient signal generator supplies said G(LR) actual attenuation coefficient during said first successive-shift-and-selective-accumulation procedure on each left-channel sample of said digital audio signal, said G(LL) actual attenuation coefficient during said second successive-shift-and-selective-accumulation procedure on each left-channel sample of said digital audio signal, said G(RL) actual attenuation coefficient during said first successive-shift-and-selective-accumulation procedure on each right-channel sample of said digital audio signal, and said G(RR) actual attenuation coefficient during said second successive-shift-and-selective-accumulation procedure on each left-channel sample of said digital audio signal.

5. An audio processing unit for controllably mixing left-channel and right-channel responses to a digital audio signal supplied in accordance with compact-disk audio signal standard, the controllable mixing being done in response to eight-bit indications of left-input-to-left-output gain G(LL), left-input-to-right-output gain G(LR), right-input-to-right-output gain G(RR) and right-input-to-left-output gain G(RL) also supplied in accordance with compact-disk audio signal standard; said audio processing unit comprising:

- an audio-processing-unit input connection for receiving time-interleaved alternate samples of the left-channel and right-channel portions of said digital audio signal supplied in accordance with the compact-disk audio signal standard;
- an attenuation coefficient signal generator responsive to said eight-bit indications of left-input-to-left-output gain G(LL), left-input-to-right-output gain G(LR), right-input-to-right-output gain G(RR) and right-input-to-left-output gain G(RL) for generating actual attenuation coefficients supplied in serial-bit form;
- circuitry for sequentially performing a first successive-shift-and-selective-accumulation procedure and a second successive-shift-and-selective-accumulation procedure on each of said time-interleaved alternate samples of the left-channel and right-channel portions of said digital audio signal received at said audio-processing-unit input connection, said first successive-shift-and-selective-accumulation procedure generating a first accumulation result, and said second successive-shirt-and-selective-accumulation procedure generating a second accumulation result;
- first additive combining circuitry for additively combining one of said first and second accumulation results for each sample of the left-channel portion of said digital audio signal with said first accumulation result for the succeeding sample of the right-channel portion of said digital audio signal to generate a successive sample of controllably mixed L-channel response; and
- second additive combining circuitry for additively combining the other of said first and second accumulation results for each samples of the left-channel portion of said digital audio signal with said second accumulation result for the succeeding sample of the right-channel portion of said digital audio signal to generate a successive sample of controllably mixed R-channel response;
- wherein said attenuation coefficient signal generator supplies said G(LL) actual attenuation coefficient during said first successive-shift-and-selective-accumulation procedure on each left-channel sample of said digital audio signal, said G(LR) actual attenuation coefficient during said second successive-shift-and-selective-accumulation procedure on each left-channel sample of said digital audio signal, said G(RL) actual attenuation coefficient during said first successive-shift-and-selective-accumulation procedure on each right-channel sample of said digital audio signal, and said G(RR) actual attenuation coefficient during said second successive-shift-and-selective-accumulation procedure on each left-channel sample of said digital audio signal; and
- wherein said circuitry for sequentially performing a first successive-shift-and-selective-accumulation procedure and a second successive-shift-and-selective-accumulation procedure on each of said samples received at said audio-processing-unit input connection comprises:
  - a shift register clocked at the same rate as said actual attenuation coefficients are supplied in serial-bit form, said shift register having a plurality of stages loaded with respective bits of each of said samples received at said input connection prior to said first successive-shift-and-selective-accumulation procedure being performed thereon and prior to said second successive-shift-and-selective-accumulation procedure being performed thereon, said plurality of stages temporarily storing a shift register output signal initially corresponding to said shift register input signal and corresponding to a successively smaller binary fraction of said digital audio signal each clocking interval thereafter;
  - a three-input multiplexer having a first input connection to which said first shift register output signal is applied, having second and third input connections, and having an output connection, said three-input multiplexer being conditioned to reproduce at its output connection said first shift register output signal applied to its first input connection during each said first successive-shift-and-selective-accumulation procedure and during each said second successive-shift-and-selective-accumulation procedure;
  - a digital adder for generating a sum output signal responsive to a first summand input signal as augmented by a second summand input signal received from the output connection of said three-input multiplexer; and
  - a first data latch for temporarily storing the sum output signal from said first digital adder for subsequent application to said first digital adder as its first summand input signal, said first data latch including circuitry for resetting the temporarily stored content thereof to arithmetic zero responsive to first data latch reset signal, said first data latch and said digital adder together forming an accumulator for said second summand input signal received from the output connection of said three-input multiplexer.

6. An audio processing unit as set forth in claim 5, wherein said first additive combining circuitry comprises, in addition to said three-input multiplexer and said digital adder:

- a second data latch responsive to a first storage clock, applied when said first successive-shift-and-selective-accumulation procedure on each left-channel sample of said digital audio signal is completed, for temporarily storing the sum output signal from said digital adder for application to the second input connection of said three-input multiplexer; said three-input multiplexer being conditioned to reproduce at its output connection the temporarily stored sum output signal from said digital adder applied to its second input connection just before or just after the first successive-shift-and-selective-accumulation procedure on each right-channel sample of said digital audio signal.

7. An audio processing unit as set forth in claim 6, wherein said second additive combining circuitry comprises, in addition to said three-input multiplexer and said digital adder:

- a third data latch responsive to a second storage clock, applied when said second successive-shift-and-selective-accumulation procedure on each left-channel sample of said digital audio signal is completed, for temporarily storing the sum output signal from said digital adder for application to the third input connection of said three-input multiplexer; said three-input multiplexer being conditioned to reproduce at its output connection the temporarily stored sum output signal from said digital adder applied to its second input connection just before or just after the second successive-shift-and-selective-accumulation procedure on each right-channel sample of said digital audio signal.

8. An audio processing unit as set forth in claim 7, wherein said attenuation coefficient signal generator supplies said actual attenuation coefficients in serial-bit form most significant bit first, and wherein loading of said shift register is such that the bits of each said sample of said digital audio signal loaded thereinto as shift register input signal are shifted out of said shift register in order of increasing significance, said audio processing unit further comprising:

a rounding circuit, said rounding circuit responsive to at least the more significant bits of each said successive sample of controllably mixed L-channel response temporarily stored in said first data latch for supplying a rounded sample of controllably mixed L-channel response, and said rounding circuit responsive to at least the more significant bits of each said successive sample of controllably mixed R-channel response temporarily stored in said first data latch for supplying a rounded sample of controllably mixed R-channel response.

9. An audio processing unit as set forth in claim 8, further comprising a de-interleaver for de-interleaving the rounded samples of controllably mixed L-channel response and the rounded samples of controllably mixed R-channel response alternately supplied from said rounding circuit.

10. An audio processing unit as set forth in claim 9, further comprising:

a first digital-to-analog converter for converting the rounded samples of controllably mixed L-channel response supplied from said de-interleaver to an analog controllably mixed L-channel output signal; and a second digital-to-analog converter for converting the rounded samples of controllably mixed R-channel response supplied from said de-interleaver to an analog controllably mixed R-channel output signal.

11. An audio processing unit for controllably mixing left-channel and right-channel responses to a digital audio signal supplied in accordance with compact-disk audio signal standard, the controllable mixing being done in response to eight-bit indications of left-input-to-left-output gain G(LL), left-input-to-right-output gain G (LR), right-input-to-right-output gain G(RR) and right-input-to-left-output gain G(RL) also supplied in accordance with compact-disk audio signal standard; said audio processing unit comprising:

an audio-processing-unit input connection for receiving time-interleaved alternate samples of the left-channel and right-channel portions of said digital audio signal supplied in accordance with the compact-disk audio signal standard;

an attenuation coefficient signal generator responsive to said eight-bit indications of left-input-to-left-output gain G(LL), left-input-to-right-output gain G(LR), right-input-to-right-output gain G(RR) and right-input-to-left-output gain G(RL) for generating actual attenuation coefficients supplied in serial-bit form;

circuitry for sequentially performing a first successive-shift-and-selective-accumulation procedure and a second successive-shift-and-selective-accumulation procedure on each of said time-interleaved alternate samples of the left-channel and right-channel portions of said digital audio signal received at said audio-processing-unit input connection, said first successive-shift-and-selective-accumulation procedure generating a first accumulation result, and said second successive-shirt-and-selective-accumulation procedure generating a second accumulation result;

first additive combining circuitry for additively combining one of said first and second accumulation results for each sample of the left-channel portion of said digital audio signal with said first accumulation result for the succeeding sample of the right-channel portion of said digital audio signal to generate a successive sample of controllably mixed L-channel response; and second additive combining circuitry for additively combining the other of said first and second accumulation results for each samples of the left-channel portion of said digital audio signal with said second accumulation result for the succeeding sample of the right-channel portion of said digital audio signal to generate a successive sample of controllably mixed R-channel response;

wherein said attenuation coefficient signal generator supplies said G(LR) actual attenuation coefficient during said first successive-shift and selective-accumulation procedure on each left-channel sample of said digital audio signal, said G(LL) actual attenuation coefficient during said second successive-shift-and-selective-accumulation procedure on each left-channel sample of said digital audio signal, said G(RL) actual attenuation coefficient during said first successive-shift-and-selective-accumulation procedure on each right-channel sample of said digital audio signal, and said G(RR) actual attenuation coefficient during said second successive-shift-and-selective-accumulation procedure on each left-channel sample of said digital audio signal; and wherein said circuitry for sequentially performing a first successive-shift-and-selective-accumulation procedure and a second successive-shift-and-selective-accumulation procedure on each of said time-interleaved alternate samples of the left-channel and right-channel portions of said digital audio signal received at said input connection comprises:

a shift register clocked at the same rate as said actual attenuation coefficients are supplied in serial-bit form, said shift register having a plurality of stages loaded with respective bits of each of said samples received at said input connection prior to said first successive-shift-and-selective-accumulation procedure being performed thereon and prior to said second successive-shift-and-selective-accumulation procedure being performed thereon, said plurality of stages temporarily storing a shift register output signal initially corresponding to said shift register input signal and corresponding to a successively smaller binary fraction of said digital audio signal each clocking interval thereafter;

a two-input multiplexer having a first input connection to which said first shift register output signal is applied, having a second input connection, and having an output connection;

a digital adder for generating a sum output signal responsive to a first summand input signal as augmented by a second summand input signal received from the output connection of said two-input multiplexer; and a first data latch for temporarily storing the sum output signal from said first digital adder for subsequent application to said first digital adder as its first summand input signal, said first data latch including circuitry for resetting the temporarily stored content thereof to arithmetic zero responsive to first data latch reset signal, said first data latch and said digital adder together forming an accumulator for said second summand input signal received from the output connection of said two-input multiplexer.

12. An audio processing unit as set forth in claim 11, wherein said first additive combining circuitry comprises, in addition to said two-input multiplexer and said digital adder:

a second data latch responsive to a first storage clock, applied when said first successive-shift-and-selective-accumulation procedure on each left-channel sample of said digital audio signal is completed, for temporarily storing the sum output signal from said digital adder for application to the second input connection of said two-input multiplexer; said two-input multiplexer being conditioned to reproduce at its output connection the temporarily stored sum output signal from said digital adder applied to its second input connection just before or just after the second successive-shift-and-selective-accumulation procedure on each right-channel sample of said digital audio signal.

13. An audio processing unit as set forth in claim 12, wherein said attenuation coefficient signal generator supplies said actual attenuation coefficients in serial-bit form most significant bit first, and wherein loading of said shift register is such that the bits of each said sample of said digital audio signal loaded thereinto as shift register input signal are shifted out of said shift register in order of increasing significance, said audio processing unit further comprising:

a rounding circuit, said rounding circuit responsive to at least the more significant bits of each said successive sample of controllably mixed L-channel response temporarily stored in said first data latch for supplying a rounded sample of controllably mixed L-channel response, and said rounding circuit responsive to at least the more significant bits of each said successive sample of controllably mixed R-channel response temporarily stored in said first data latch for supplying a rounded sample of controllably mixed R-channel response.

14. An audio processing unit as set forth in claim 13, further comprising a de-interleaver for de-interleaving the rounded samples of controllably mixed L-channel response and the rounded samples of controllably mixed R-channel response alternately supplied from said rounding circuit.

15. An audio processing unit as set forth in claim 14, further comprising:

a first digital-to-analog converter for converting the rounded samples of controllably mixed L-channel response supplied from said de-interleaver to an analog controllably mixed L-channel output signal; and a second digital-to-analog converter for converting the rounded samples of controllably mixed R-channel response supplied from said de-interleaver to an analog controllably mixed R-channel output signal.

16. An audio processing unit for controllably mixing left-channel and right-channel responses to a digital audio signal supplied in accordance with a given compact-disk audio signal standard, the controllable mixing being done in response to eight-bit indications to left-input-to-left-output gain G(LL), left-input-to-right-output gain G(LR), right-input-to-right-output gain G(RR) and right-input-to-left-output gain G(RL) also supplied in accordance with said compact-disk audio signal standard; said audio processing unit comprising:

an input connection for receiving time-interleaved alternate samples of the left-channel and right-channel portions of said digital audio signal supplied in accordance with said compact-disk audio signal standard;

an attenuation coefficient signal generator responsive to said eight-bit indications of left-input-to-left-output gain G(LL), left-input-to-right-output gain G(LR), right-input-to-right-output gain G(RR) and right-input-to-left-output gain G(RL) for generating actual attenuation coefficients in at least substantial accordance with the following table:

| Required attenuation | Standardized value | | Attenuation (binary code) | | Attenuation (DB) |
|---|---|---|---|---|---|
| 0 DB | 1.000000 | → | 11111111 | → | −0.0340 DB |
| −1 DB | 0.891251 | → | 11100100 | → | −1.0061 DB |
| −2 DB | 0.794328 | → | 11001011 | → | −2.0149 DB |
| −3 DB | 0.707946 | → | 10110101 | → | −3.0112 DB |
| −4 DB | 0.630957 | → | 10100001 | → | −4.0283 DB |
| −5 DB | 0.562341 | → | 10001111 | → | −5.0581 DB |
| −6 DB | 0.501187 | → | 10000000 | → | −6.0206 DB |
| −7 DB | 0.446684 | → | 01110010 | → | −7.0267 DB |
| −8 DB | 0.398107 | → | 01100101 | → | −8.0784 DB |
| −9 DB | 0.354813 | → | 01011010 | → | −9.0799 DB |
| −10 DB | 0.316228 | → | 01010000 | → | −10.1030 DB |
| −11 DB | 0.281838 | → | 01001000 | → | −11.0181 DB |
| −12 DB | 0.251189 | → | 01000000 | → | −12.0412 DB |
| −13 DB | 0.223872 | → | 00111001 | → | −13.0473 DB |
| −14 DB | 0.199526 | → | 00110011 | → | −14.0134 DB |
| −15 DB | 0.177828 | → | 00101101 | → | −15.1005 DB |
| −16 DB | 0.158489 | → | 00101000 | → | −16.1236 DB |
| −17 DB | 0.141254 | → | 00100100 | → | −17.0387 DB |
| −18 DB | 0.125893 | → | 00100000 | → | −18.0618 DB |
| −19 DB | 0.112202 | → | 00011100 | → | −19.2216 DB |
| −20 DB | 0.100000 | → | 00011001 | → | −20.2060 DB |
| −21 DB | 0.089125 | → | 00010110 | → | −21.3163 DB |
| −22 DB | 0.079433 | → | 00010100 | → | −22.1442 DB |
| −23 DB | 0.070795 | → | 00010010 | → | −23.0593 DB |
| −24 DB | 0.063096 | → | 00010000 | → | −24.0824 DB |
| −25 DB | 0.056234 | → | 00001110 | → | −25.2422 DB |
| −26 DB | 0.050119 | → | 00001100 | → | −26.5812 DB |
| −27 DB | 0.044668 | → | 00001011 | → | −27.3369 DB |
| −28 DB | 0.039811 | → | 00001010 | → | −28.1648 DB |
| −29 DB | 0.035481 | → | 00001001 | → | −29.0799 DB |
| −30 DB | 0.031623 | → | 00001000 | → | −30.1030 DB |
| −31 DB | 0.028184 | → | 00000111 | → | −31.2628 DB |
| −32 DB | 0.025119 | → | 00000110 | → | −32.6018 DB |
| −33 DB | 0.022387 | → | 00000101 | → | −34.1854 DB |
| −34 DB | 0.019953 | → | 00000101 | → | −34.1854 DB |
| −35 DB | 0.017783 | → | 00000100 | → | −36.1236 DB |
| −36 DB | 0.015849 | → | 00000100 | → | −36.1236 DB |
| −37 DB | 0.014125 | → | 00000011 | → | −38.6224 DB |
| −38 DB | 0.012589 | → | 00000011 | → | −38.6224 DB |
| −39 DB | 0.011220 | → | 00000010 | → | −42.1442 DB |
| −40 DB | 0.010000 | → | 00000010 | → | −42.1442 DB |
| −41 DB | 0.008913 | → | 00000010 | → | −42.1442 DB |

-continued

| Required attenuation | Standardized value | Attenuation (binary code) | Attenuation (DB) | |
|---|---|---|---|---|
| −42 DB | 0.007943 → | 00000010 → | −42.1442 DB | |
| −43 DB | 0.007079 → | 00000001 → | −48.1648 DB | |
| −44 DB | 0.006310 → | 00000001 → | −48.1648 DB | |
| −45 DB | 0.005623 → | 00000001 → | −48.1648 DB | |
| −46 DB | 0.005012 → | 00000001 → | −48.1648 DB | |
| −47 DB | 0.004467 → | 00000001 → | −48.1648 DB | |
| −48 DB | 0.003981 → | 00000001 → | −48.1648 DB | |
| −49 DB | 0.003548 → | 00000000 → | −Inf DB | |
| −50 DB | 0.003162 → | 00000000 → | −Inf DB | |
| −51 DB | 0.002818 → | 00000000 → | −Inf DB | |
| −52 DB | 0.002512 → | 00000000 → | −Inf DB | |
| −53 DB | 0.002239 → | 00000000 → | −Inf DB | |
| −54 DB | 0.001995 → | 00000000 → | −Inf DB | |
| −55 DB | 0.001778 → | 00000000 → | −Inf DB | |
| −56 DB | 0.001585 → | 00000000 → | −Inf DB | Infinite attenuation; |
| −57 DB | 0.001413 → | 00000000 → | −Inf DB | |
| −58 DB | 0.001259 → | 00000000 → | −Inf DB | |
| −59 DB | 0.001122 → | 00000000 → | −Inf DB | |
| −60 DB | 0.001000 → | 00000000 → | −Inf DB | |
| −61 DB | 0.000591 → | 00000000 → | −Inf DB | |
| −62 DB | 0.000794 → | 00000000 → | −Inf DB | |
| −63 DB | 0.000708 → | 00000000 → | −Inf DB | |
| −64 DB | 0.000631 → | 00000000 → | −Inf DB | |
| −65 DB | 0.000562 → | 00000000 → | −Inf DB | |
| ⁞ | ⁞ | ⁞ | ⁞ | |
| −127 DB | 0.000000 → | 00000000 → | −Inf DB | | a digital multiplier providing time sharing processor in which each sample L of the left-channel portion of said digital audio signal is multiplied by the actual left-input-to-left-output gain G(LL) supplied from said attenuation coefficient signal generator to generate a product L*G(LL), in which each sample L of the left-channel portion of said digital audio signal is multiplied by the actual left-input-to-right-output gain G(LR) supplied from said attenuation coefficient signal generator to generate a product L*G(LR), in which each corresponding sample R of the right-channel portion of said digital audio signal is multiplied by the actual right-input-to-left-output gain G(RL) supplied in from said attenuation coefficient signal generator to generate a product R*G(RL), and in which each corresponding sample R of the right-channel portion of said digital audio signal is multiplied by the actual right-input-to-right-output gain G(RR) supplied from said attenuation coefficient signal generator to generate a product R*G(RR);

circuitry for additively combining said product L*G(LL) and said product R*G(RL) to generate a successive sample of controllably mixed L-channel response; and circuitry for additively combining said product L*G(LR) and said product R*G(RR) to generate a successive sample of controllably mixed R-channel response.

17. An audio processing unit as set forth in claim 16, wherein said circuitry for additively combining said product L*G(LL) and said product R*G(RL) to generate a successive sample of controllably mixed L-channel response and said circuitry for additively combining said product L*G(LR) and said product R*G(RR) to generate a successive sample of controllably mixed R-channel response together comprise memory, for temporarily storing said product L*G(LL) after its generation until said product R*G(RL) is generated, and for temporarily storing said product L*G(LR) after its generation until said product R*G(RR) is generated; and a digital adder, for adding said product L*G(LL) as retrieved from temporary storage within said memory to said product R*G(RL) to generate said successive sample of controllably mixed L-channel response, and for adding said product L*G(LR) as retrieved from temporary storage within said memory to said product R*G(RR) to generate said successive sample of controllably mixed R-channel response.

18. An audio processing unit as set forth in claim 17, wherein said memory for temporarily storing said product L*G(LL) after its generation and for temporarily storing said product L*G(LR) after its generation comprises respective clocked data latches for said product L*G(LL) and for said product L*G(LR).

19. An audio processing unit as set forth in claim 17, further comprising a de-interleaver for receiving successive samples of said controllably mixed L-channel and R-channel responses as supplied on a time-interleaved basis from said digital adder and supplying corresponding samples of said controllably mixed L-channel and R-channel responses simultaneously.

20. An audio processing unit as set forth in claim 19, further comprising:

a first digital-to-analog converter for converting samples of said controllably mixed L-channel response supplied from said de-interleaver to an analog controllably mixed L-channel output signal; and a second digital-to-analog converter for converting samples of said controllably mixed R-channel response supplied from said de-interleaver to an analog controllably mixed R-channel output signal.

* * * * *